(12) United States Patent
Qin et al.

(10) Patent No.: US 11,455,578 B2
(45) Date of Patent: *Sep. 27, 2022

(54) SYSTEM AND METHOD FOR RIDE ORDER DISPATCHING AND VEHICLE REPOSITIONING

(71) Applicant: Beijing DiDi Infinity Technology and Development Co., Ltd., Beijing (CN)

(72) Inventors: Zhiwei Qin, San Jose, CA (US); Xiaocheng Tang, Mountain View, CA (US); Yan Jiao, Sunnyvale, CA (US); Chenxi Wang, Seattle, WA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 886 days.

This patent is subject to a terminal disclaimer.

(21) Appl. No.: 16/237,175

(22) Filed: Dec. 31, 2018

(65) Prior Publication Data

US 2020/0074354 A1     Mar. 5, 2020

Related U.S. Application Data

(60) Provisional application No. 62/726,898, filed on Sep. 7, 2018, provisional application No. 62/774,322, filed on Dec. 2, 2018.

(51) Int. Cl.
*G06Q 10/02* (2012.01)
*G06Q 50/30* (2012.01)
(Continued)

(52) U.S. Cl.
CPC .......... *G06Q 10/02* (2013.01); *G01C 21/3438* (2013.01); *G06N 3/08* (2013.01);
(Continued)

(58) Field of Classification Search
CPC ........ G06Q 10/02; G06Q 50/30; G06N 20/00; G06N 3/08; G08G 1/202; G01C 21/3438
(Continued)

(56) References Cited

U.S. PATENT DOCUMENTS

| 2018/0046961 A1* | 2/2018 | Tulabandhula ........ G08G 1/202 |
| 2019/0025820 A1* | 1/2019 | Ferguson ............... G08G 1/143 |
| 2020/0357285 A1 | 11/2020 | Kim |

FOREIGN PATENT DOCUMENTS

| CA | 2636537 A1 | 12/2009 |
| CN | 107194612 A | 9/2017 |

(Continued)

OTHER PUBLICATIONS

Link et al., "Efficient Large-Scale Fleet Management via Multi-Agent Deep Reinforcement Learning"; Aug. 23, 2018; Proceedings of the 24th ACMSIGKDD International Conference on Knowledge Discovery & Data Mining (KDD'18), pp. 1774-1783 (Year: 2018).*

(Continued)

*Primary Examiner* — Shannon S Campbell
*Assistant Examiner* — Freda A Nelson
(74) *Attorney, Agent, or Firm* — Sheppard Mullin Richter & Hampton LLP

(57) ABSTRACT

Systems and methods are provided for ride order dispatching and vehicle repositioning. A method for ride order dispatching and vehicle repositioning, comprises: obtaining information comprising a location of a vehicle, current orders, and a current time; inputting the obtained information to a trained model; and determining action information for the vehicle based on an output of the trained model, the action information comprising: re-positioning the vehicle or accepting a ride order. The model is configured with: receiving information of drivers and information of orders as inputs; obtaining a global state based on the information of (Continued)

Exemplary state transitions used in MD-DQN

Exemplary state transitions used in SD-DQN drivers, the information of orders, and a global time; and querying a plurality of driver-order pairs and driver-reposition pairs based at least on the obtained global state to determine the action information as the output.

20 Claims, 12 Drawing Sheets

(51) Int. Cl.
    *G06N 20/00*     (2019.01)
    *G01C 21/34*     (2006.01)
    *G06N 3/08*     (2006.01)
    *G08G 1/00*     (2006.01)

(52) U.S. Cl.
    CPC ............. *G06N 20/00* (2019.01); *G06Q 50/30* (2013.01); *G08G 1/202* (2013.01)

(58) Field of Classification Search
    USPC .......................................................... 705/5
    See application file for complete search history.

(56) References Cited

FOREIGN PATENT DOCUMENTS

| CN | 107832882 A | * | 3/2018 |
|---|---|---|---|
| CN | 107832882 A | | 3/2018 |

OTHER PUBLICATIONS

Xu et al., "Large-Scale Order Dispatch in On-Demand Ride-Hailing Platforms: A Learning and Planning Approach"; Aug. 23, 2018; Proceedings of the 24th ACM SIGKDD International Conference on Knowledge Discovery & Data Mining (KDD'18), pp. 905-913 (Year: 2018).*
PCT International Search Report and the Written Opinion dated Apr. 2, 2019, issued in related International Application No. PCT/US2018/068183 (11 pages).
Lin K. et al., "Efficient Large-Scale Fleet Management via Multi-Agent Deep Reinforcement Learning", Proceedings of the 24th ACM SIGKDD International Conference on Knowledge Discovery & Data Mining (KDD'18), Aug. 23, 2018, pp. 1774-1783.
Xu Z. et al., "Large-Scale Order Dispatch in On-Demand Ride-Hailing Platforms: A Learning and Planning Approach", Proceedings of the 24th ACM SIGKDD International Conference on Knowledge Discovery & Data Mining(KDD'18), Aug. 23, 2018, pp. 905-913.
Oda T. et al., "MOVI: A Model-Free Approach to Dynamic Fleet Management", Proceedings of IEEE Infocom 2018, Apr. 19, 2018, pp. 1-9.
PCT International Search Report and the Written Opinion dated Apr. 10, 2019, issued in related International Application No. PCT/US2018/068191 (11 pages).
Irwan Bello et al., "Neural Combinatorial Optimization with Reinforcement Learning", arXiv:1611.09940v3 [cs.AI] Jan. 12, 2017, pp. 1-15.
Caroline Claus et al., "The Dynamics of Reinforcement Learning in Cooperative Multiagent Systems", AAAI-98 Proceedings, 1998, pp. 746-752.
DiDi Chuxing, "DiDi Launches GAIA Initiative to Facilitate Data-Driven Research in Transportation", http://www.didichuxing.com/en/press-news/bgcitgfc.html, 2017.
Drew Fudenberg et al., "The Theory of Learning in Games", Table of Contents, MIT Press, vol. 2, 1998.
Hanjun Dai et al., "Learning Combinatorial Optimization Algorithms over Graphs", Advances in Neural Information Processing Systems, 2017, pp. 6351-6361.
Michael L. Littman, "Value-function reinforcement learning in Markov games", Journal of Cognitive Systems Research, vol. 2, No. 1, 2001, pp. 55-66.
Volodymyr Mnih et al., "Recurrent Models of Visual Attention", Advances in Neural Information Processing Systems, 2014, pp. 2204-2212.
Volodymyr Mnih et al., "Human-level control through deep reinforcement learning", Nature, vol. 518, Feb. 26, 2015, pp. 529-533.
Volodymyr Mnih et al., "Asynchronous Methods for Deep Reinforcement Learning", International Conference on Machine Learning, 2016, pp. 1928-1937.
James Munkres, "Algorithms for the Assignment and Transportation Problems", J. Soc. Indus. Appl. Math., vol. 5, No. 1, Mar. 1957, pp. 32-38.
Mohammadreza Nazari et al., "Reinforcement Learning for Solving the Vehicle Routing Problem", 32nd Conference on Neural Information Processing Systems (NeurIPS 2018), 2018, Montreal, Canada.
Kagan Tumer et al., "Time-Extended Policies in Multi-Agent Reinforcement Learning", Proceedings of the Third International Joint Conference on Autonomous Agents and Multiagent Systems, vol. 3, 2004, IEEE Computer Society, pp. 1338-1339.
Oriol Vinyals et al., "Pointer Networks", Advances in Neural Information Processing Systems, 2015, pp. 2692-2700.
David H. Wolpert et al., "Optimal Payoff Functions for Members of Collectives", Advances in Complex Systems, vol. 4, Nos. 2 & 3, Oct. 2001, pp. 265-279.
Zhaodong Wang et al., "Deep Reinforcement Learning with Knowledge Transfer for Online Rides Order Dispatching" IEEE ICOM 2018.
R.H. Crites et al., "Elevator Group Control Using Multiple Reinforcement Learning Agents", Machine Learning 33 (2-3), 1998, pp. 235-262.
Lingyu Zhang et al., "A Taxi Order Dispatch Model Based on Combinatorial Optimization", Proceedings of the 23rd ACM SIGKDD International Conference on Knowledge Discovery and Data Mining, ACM, 2017, pp. 2151-2159.
Hado van Hasselt et al., "Deep Reinforcement Learning with Double Q-Learning", Proceedings of the 30th AAAI Conference on Artificial Intelligence, AAAI-16, 2016, pp. 2094-2100.
Non-Final Office Action dated Apr. 1, 2022, issued in related U.S. Appl. No. 16/237,103 (7 pages).

* cited by examiner

400

402: obtaining information comprising a location of a vehicle, current orders, and a current time

404: inputting the obtained information to a trained model of a model

406: determining action information for the vehicle based on an output of the trained model, the action information comprising: re-positioning the vehicle or accepting a ride order. The model comprises a multi-driver deep-Q network (MD-DQN) and configured with model instructions for performing:

receiving information of drivers and information of orders as inputs obtaining a global state based on the information of drivers, the information of orders, and a global time, each state transition of the global state being from a driver of the drivers becomes available to another driver of the drivers becomes available querying a plurality of driver-order pairs and driver-reposition pairs based at least on the obtained global state to determine a Q-value of the MD-DQN for the driver determining the action information as the output based at least on the determined Q-value to optimize a total return for the drivers

FIG. 4

SYSTEM AND METHOD FOR RIDE ORDER DISPATCHING AND VEHICLE REPOSITIONING

CROSS REFERENCE TO RELATED APPLICATION

The present application is based on and claims priority to the U.S. Provisional Application No. 62/726,898, filed on Sep. 4, 2018 and entitled "Q-learning approaches to dynamic multi-driver dispatching and repositioning," and the U.S. Provisional Application No. 62/774,322, filed on Dec. 2, 2018 and entitled "Q-Learning Provisional Application." The contents of all of the above applications are incorporated herein by reference in their entirety.

FIELD OF THE INVENTION

This disclosure generally relates to methods and devices for ride order dispatching and vehicle repositioning.

BACKGROUND

A vehicle dispatch platform can automatically allocate transportation requests to corresponding vehicles for providing transportation services. Each vehicle driver is rewarded for providing the transportation service. The vehicle dispatch platform needs to make decisions such as for assigning available drivers to nearby unassigned passengers over a large spatial decision-making region (e.g., a city) or for repositioning drivers who have no nearby orders. Such decisions not only have immediate to short-term impact in the form of revenue from assigned orders and driver availability, but also long-term effects on the distribution of available drivers across the city. This distribution critically affects how well future orders can be served. The need to address the exploration-exploitation dilemma as well as the delayed consequences of assignment actions makes this a technical challenge.

SUMMARY

Various embodiments of the present disclosure can include systems, methods, and non-transitory computer readable media for ride order dispatching and vehicle repositioning.

According to one aspect, a method for ride order dispatching and vehicle repositioning comprises: obtaining information comprising a location of a vehicle, current orders, and a current time; inputting the obtained information to a trained model of a model; and determining action information for the vehicle based on an output of the trained model, the action information comprising: re-positioning the vehicle or accepting a ride order. The model comprises a multi-driver deep-Q network (MD-DQN) and is configured with model instructions for performing: receiving information of drivers and information of orders as inputs; obtaining a global state based on the information of drivers, the information of orders, and a global time, each state transition of the global state being from a driver of the drivers becomes available to another driver of the drivers becomes available; querying a plurality of driver-order pairs and driver-reposition pairs based at least on the obtained global state to determine a Q-value of the MD-DQN for the driver; and determining the action information as the output based at least on the determined Q-value to optimize a total return for the drivers.

In some embodiments, the method further comprises: providing the action information to the vehicle, wherein the action information maximizes a reward for the vehicle's driver.

In some embodiments, for each of the drivers, the information of drivers comprises two-dimensional location coordinates and a step-left scalar value; and the step-left scalar value is based on a time of arrival at a destination of a currently dispatched order.

In some embodiments, for each of the orders, the information of orders comprises two-dimensional start location coordinates, two-dimensional end location coordinates, a price scale value, and a time waiting scalar value; and the time waiting scalar value is a time since the each of the orders started requesting a vehicle dispatch.

In some embodiments, obtaining the global state based on the information of drivers, the information of orders, and the global time comprises: embedding the information of drivers and the information of orders in memory cells to obtain driver embedding and order embedding; performing a round of attention of an attention mechanism to obtain driver context based on the driver embedding and obtain order context based on the order embedding; and concatenating the driver embedding, the order embedding, and the global time to obtain the global state.

In some embodiments, querying the plurality of driver-order pairs and driver-reposition pairs based at least on the obtained global state to determine the action information as the output comprises: querying all driver-order pairs with respect to the drivers and the orders to obtain first Q-values respectively, and querying all driver-reposition pairs with respect to the drivers and repositioning movements to obtain second Q-values respectively; obtaining a maximum Q-value among the first and second Q-values; determining an optimal driver-order pair or an optimal driver-reposition pair associated with the maximum Q-value; and determining the action information as dispatching a corresponding driver to fulfill a corresponding order according to the optimal driver-order pair or repositioning a corresponding driver according to the optimal driver-reposition pair.

In some embodiments, repositioning the corresponding driver comprises: staying at a current location of the corresponding driver.

In some embodiments, querying all the driver-order pairs with respect to the drivers and the orders to obtain the first Q-values respectively comprises: determining the first Q-values respectively based on a first neural network; and the first neural network takes the driver embedding, the order embedding, and the global states as inputs.

In some embodiments, querying all the driver-reposition pairs with respect to the drivers and the repositioning movements to obtain the second Q-values respectively comprises: determining the second Q-values respectively based on a second neural network; and the second neural network takes the driver embedding, repositioning movement embedding, and the global states as inputs, wherein the repositioning movement embedding is obtained by embedding the repositioning movements.

According to another aspect, a system for ride order dispatching and vehicle repositioning comprises a processor and a non-transitory computer-readable storage medium storing instructions that, when executed by the processor, cause the system to perform operations comprising: obtaining information comprising a location of a vehicle, current orders, and a current time; inputting the obtained information to a trained model of a model; and determining action information for the vehicle based on an output of the trained model, the action information comprising: re-positioning the vehicle or accepting a ride order. The model comprises a multi-driver deep-Q network (MD-DQN) and is configured with model instructions for performing: receiving information of drivers and information of orders as inputs; obtaining a global state based on the information of drivers, the information of orders, and a global time, each state transition of the global state being from a driver of the drivers becomes available to another driver of the drivers becomes available; querying a plurality of driver-order pairs and driver-reposition pairs based at least on the obtained global state to determine a Q-value of the MD-DQN for the driver; and determining the action information as the output based at least on the determined Q-value to optimize a total return for the drivers.

According to another aspect, a non-transitory computer-readable storage medium stores instructions that, when executed by a processor, cause the processor to perform operations comprising: obtaining information comprising a location of a vehicle, current orders, and a current time; inputting the obtained information to a trained model of a model; and determining action information for the vehicle based on an output of the trained model, the action information comprising: re-positioning the vehicle or accepting a ride order. The model comprises a multi-driver deep-Q network (MD-DQN) and is configured with model instructions for performing: receiving information of drivers and information of orders as inputs; obtaining a global state based on the information of drivers, the information of orders, and a global time, each state transition of the global state being from a driver of the drivers becomes available to another driver of the drivers becomes available; querying a plurality of driver-order pairs and driver-reposition pairs based at least on the obtained global state to determine a Q-value of the MD-DQN for the driver; and determining the action information as the output based at least on the determined Q-value to optimize a total return for the drivers.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4 illustrates a flowchart of an exemplary method for ride order dispatching and vehicle repositioning, in accordance with various embodiments.

DETAILED DESCRIPTION

Figure 1:
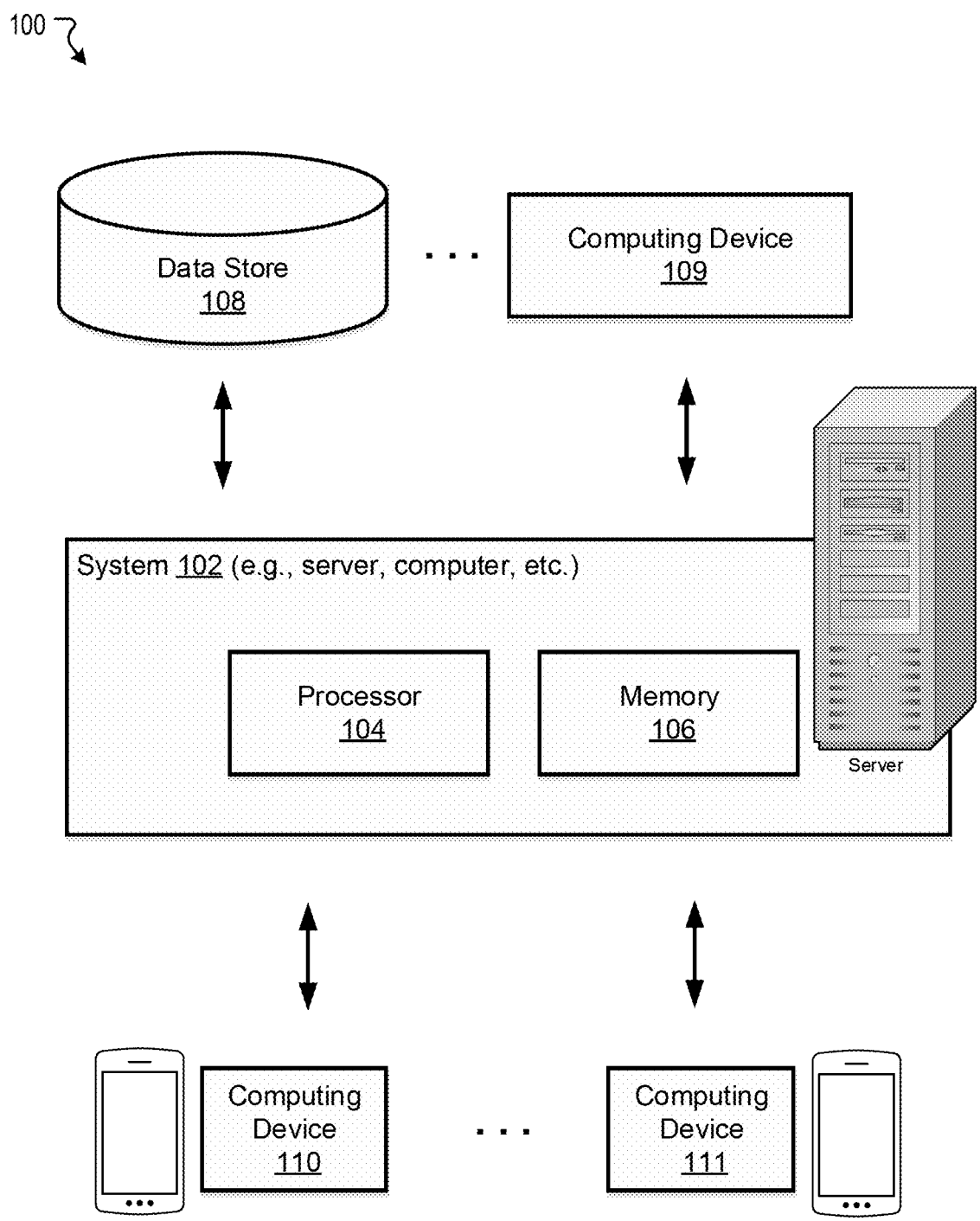
FIG. 1 illustrates an exemplary system for ride order dispatching and vehicle repositioning, in accordance with various embodiments.

Vehicle dispatch platforms may be provided for transportation services. Such platform may also be referred to as a vehicle platform or vehicle hailing platform, accessible through devices such as mobile phones installed with a platform application. Via the application, users (ride requestors) can transmit transportation requests to the vehicle platform. The transportation request comprises, for example, a pick-up location and a destination of the request and a current location of the user. The vehicle platform may relay the requests to vehicle drivers based on various factors (e.g., proximity to the location of the requestor or the pick-up location). The vehicle drivers can choose from the requests, and each can pick one to accept, fulfill the request, and be rewarded accordingly. After each trip, the vehicle driver may search for more requests, receive more requests from the vehicle platform, and/or receive other instructions (e.g., repositioning to another location, etc.) from the vehicle platform.

In various cases, the vehicle platform may make decisions such as for assigning available drivers to nearby unassigned passengers over a large spatial decision-making region (e.g., a city) or for repositioning drivers who have no nearby orders. Multi-driver dispatching and repositioning in ride-sharing is a spatially extended and dynamic resource allocation problem that is intractable to solve exactly. Such decisions not only have immediate to short-term impact in the form of revenue from assigned orders and driver availability, but also long-term effects on the distribution of available drivers across the city. This distribution critically affects how well future orders can be served.

Some existing methods focus on static (i.e., those where all orders are known up front) or single-driver order dispatching, which turns out to be inadequate. This is because, for use in ride-sharing applications, one needs to find good policies that can accommodate a multi-driver dispatching scheme where demands are not known up front but rather generated dynamically throughout an episode (e.g., a day).

This technical problem may be referred to as the multi-driver vehicle dispatching and repositioning problem (MDVDRP).

In various embodiments, the abstraction of MDVDRP may be a continuous-time semi-Markov decision process with the following state-reward dynamics. At any time, state is given by a set of requesting orders $O_t^i \in \emptyset_t$, a set of drivers $d_t^i \in D_t$, and time of day t. There is also a set of repositioning movements $m^j \in M$, which are not part of state but will be part of the action space. The size of $\emptyset_t$ may change in time from orders stochastically appearing in the environment and disappearing as the orders being served or canceled (orders are canceled, for example, by riders or if they do not receive a driver assignment within a given time window). $D_t$ can be further subdivided into available drivers and unavailable drivers. A driver is unavailable if they are currently fulfilling an order. An action may be a pairing of an available driver with a requesting order or repositioning movement. An order may be associated with a pickup location (e.g., where the passenger is currently located), and an end location/destination (e.g., where the customer wants to go), a price, and the amount of time since the order arrived in the vehicle platform. A driver may be associated with her position if she is available, or with her paired order or reposition movement if she is unavailable. A reposition movement may comprise a direction and duration, e.g., "travel west for three minutes." When a driver is assigned to an order, the agent (machine learning algorithm or a system or device that at least partially implements the machine learning algorithm, for example, a modeled driver) receives a reward equal to the price of that order, and the driver becomes unavailable until after having picked up her order at the start location and dropped passenger(s) off at the end location. When a driver is assigned a repositioning movement, the agent receives no reward and repositions until the driver either reaches the maximum repositioning duration or is assigned an order. When any action is taken in the environment, time advances to the next time that there is a driver available and not repositioning. If there are multiple non-repositioning drivers at time t and multiple requesting orders, time will not advance after the first action is taken since there will still be at least one available non-repositioning driver and order pairing.

Existing approaches to solve the dispatching and routing problems are typically based on static and/or single-driver. For instance, the encoding-decoding approach processes first information into a global-context, from which actions are decoded sequentially. The pointer networks approach offers an approximate solution to TSPs (Travelling salesman problems) by encoding cities (orders) sequentially with a recurrent network, and then producing a solution by sequentially "pointing" to orders using an attention mechanism. The network is trained with a supervised loss function by imposing a fixed ordering rule on orders. Alternatively, based on the pointer network architecture, the network can be trained with policy gradients and so may dispense with the fixed ordering during the decoding phase. However, this approach imposes a sequential structure on the inputs when no natural ordering choice exists. In reality, the TSP is given by an unordered set of orders which one must output sequentially. This suggests one should use a non-sequential architecture for encoding, and decode sequentially. Because pointer networks impose an ordering on orders, as a result the pointer network may differ in performance depending on the order in which one provides orders to the encoder. This is an undesirable mismatch between the nature of the problem and the proposed solution. Additionally, the recurrent encoding scheme in the existing method is not well suited for dynamic environments (i.e., those where orders are generated throughout an episode). This is due to RNN encoding scheme, which must be restarted with a new full forward pass through time whenever a new order is added to the environment.

For another instance, another existing architecture, trained with policy gradients, attempts to approximately solve TSP as well as the more general single-driver Vehicle Routing Problem (VRP). The architecture is able to address the issues of sequential encoding by instead embedding each order into a memory slot. Then, at each decoding step, an attention mechanism is used to produce a global context vector, which is then used as the query vector for a second layer of attention that assigns probabilities to each memory slot index. This removes any notion of ordering in the inputs, and dispenses with the sequential encoding in. However, such environments are all single-driver.

For another instance, another existing method offers a value-based and single-driver approach to the dynamic fleet management problem. In dynamic fleet management, one is concerned with repositioning available drivers, while performing actual assignments via hard-coded rules (in their case, pickup distance minimization). Thus, this approach cannot accurately model the reality.

For another instance, heuristic solutions construct an approximation to the true problem by ignoring the spatial extent, or the temporal dynamics, or both, and solve the approximate problem exactly. One such example is myopic pickup distance minimization (MPDM), which ignores temporal dynamics and always assigns the closest available driver to a requesting order. While MPDM may provide a baseline in some cases, it can induce severely suboptimal behavior depending on order distribution and pricing.

To at least mitigate the deficiencies of current technologies, provide a technical solution to the above-described technical problem, and improve computer functionalities, systems and methods for ride order dispatching and vehicle repositioning are disclosed. In various embodiments, a neural network architecture uses a global representation of state as input to learn single-driver and multi-driver action-value-functions to continuously make non-myopic dispatching and repositioning assignments. A global state representation is constructed along with a neural network (NN) architecture that can take this global state as input and produce action-values (Q-values) for each state. Due to the variable number of orders, attention mechanisms are used both for input and output of the NN. Two methods are disclosed for training this network to perform dispatching and repositioning: single-driver deep Q-learning network (SD-DQN) and multi-driver deep Q-learning network (MD-DQN). Both approaches may involve the deep Q-learning network (DQN) algorithm but differ from each other in the extent to which individual driver behaviors are coordinated. SD-DQN learns a Q-value function of global state for single drivers by accumulating rewards along single-driver trajectories. On the other hand, MD-DQN uses system-centric trajectories, so that the Q-value function accumulates rewards for all drivers.

The advantages of these methods are evaluated and demonstrated on a static version of the dispatching problem, on illustrative multi-driver dynamic dispatching and repositioning problems, and on a data-driven dispatching and repositioning simulator. In various embodiments, MD-DQN can learn superior behavior policies in some cases, but in practice SD-DQN is competitive in all environments and scales well with the number of drivers in the MDVDRP. Empirically, the performance of SD-DQN and MD-DQN are compared on a static assignment problem, illustrative MDVDRPs, and a data-driven MDVDRP designed using real world ride-sharing dispatching data.

FIG. 1 illustrates an exemplary system 100 for dispatching ride order, in accordance with various embodiments. As shown in FIG. 1, the exemplary system 100 can comprise at least one computing system 102 that includes one or more processors 104 and one or more memories 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phone, tablet, server, computer, wearable device (smart watch), etc. The system 102 above may be installed with appropriate software (e.g., platform program, etc.) and/or hardware (e.g., wires, wireless connections, etc.) to access other devices of the system 100.

The system 100 may include one or more data stores (e.g., a data store 108) and one or more computing devices (e.g., a computing device 109) that are accessible to the system 102. In some embodiments, the system 102 may be configured to obtain data (e.g., training data such as location, time, and fees for multiple historical vehicle transportation trips) from the data store 108 (e.g., a database or dataset of historical transportation trips) and/or the computing device 109 (e.g., a computer, a server, or a mobile phone used by a driver or passenger that captures transportation trip information such as time, location, and fees). The system 102 may use the obtained data to train the algorithm for ride order dispatching and vehicle repositioning. The location may comprise GPS (Global Positioning System) coordinates of a vehicle.

The system 100 may further include one or more computing devices (e.g., computing devices 110 and 111) coupled to the system 102. The computing devices 110 and 111 may comprise devices such as cellphone, tablet, computer, wearable device (smart watch), etc. The computing devices 110 and 111 may transmit or receive data to or from the system 102.

In some embodiments, the system 102 may implement an online information or service platform. The service may be associated with vehicles (e.g., cars, bikes, boats, airplanes, etc.), and the platform may be referred to as a vehicle (service hailing or ride order dispatching) platform. The platform may accept requests for transportation, identify vehicles to fulfill the requests, arrange for pick-ups, and process transactions. For example, a user may use the computing device 110 (e.g., a mobile phone installed with a software application associated with the platform) to request transportation from the platform. The system 102 may receive the request and relay it to various vehicle drivers (e.g., by posting the request to mobile phones carried by the drivers). A vehicle driver may use the computing device 111 (e.g., another mobile phone installed with the application associated with the platform) to accept the posted transportation request and obtain pick-up location information. Fees (e.g., transportation fees) can be transacted among the system 102 and the computing devices 110 and 111. Some platform data may be stored in the memory 106 or retrievable from the data store 108 and/or the computing devices 109, 110, and 111. For example, for each trip, the location of the origin and destination (e.g., transmitted by the computing device 111), the fee, and the time can be obtained by the system 102.

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet) through which data can be communicated. Various aspects of the system 100 are described below in reference to FIG. 2 to FIG. 5.

Figure 2:
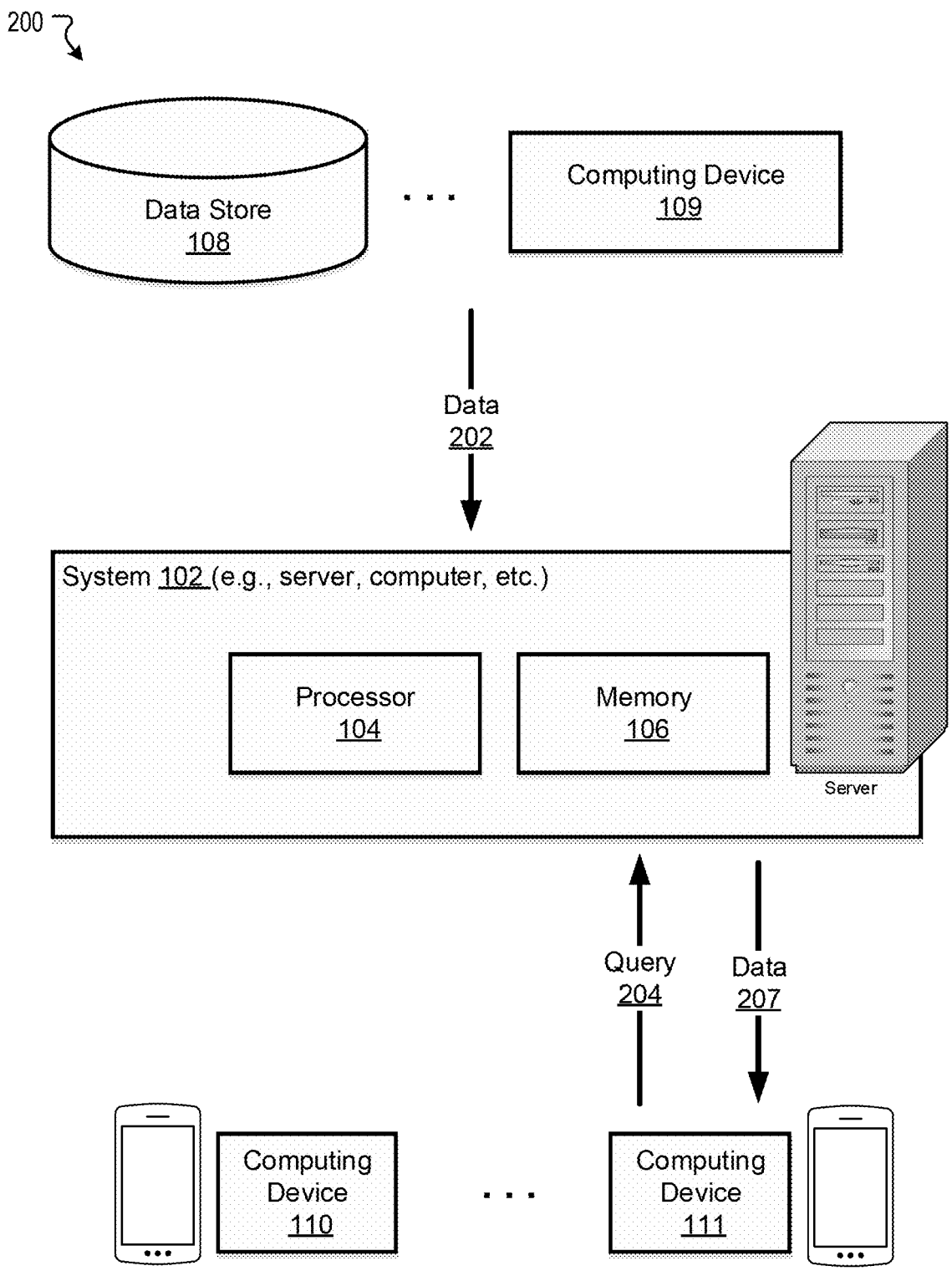
FIG. 2 illustrates an exemplary system for ride order dispatching and vehicle repositioning, in accordance with various embodiments.

FIG. 2 illustrates an exemplary system 200 for dispatching ride order, in accordance with various embodiments. The operations shown in FIG. 2 and presented below are intended to be illustrative. In various embodiments, the system 102 may obtain data 202 (e.g., training data comprising the state, action, and reward for historical trips) from the data store 108 and/or the computing device 109. The obtained data 202 may be stored in the memory 106. The system 102 may train an algorithm with the obtained data 202 to learn a model for dispatching ride order. The computing device 111 may transmit query 204 to the system 102. The computing device 111 may be associated with a driver of a vehicle described herein (e.g., taxi, a service-hailing vehicle). The query 204 may comprise information such as a current location of the vehicle, a current time, a completed trip (origin, destination, time, fees), etc. Accordingly, the system 102 may send data 207 to the computing device 111 or one or more other devices. The data 207 may comprise an instruction or recommendation for an action, such as repositioning to another location, accepting a new order, etc.

In various embodiments, a global state representation for the driver dispatching problem and a neural architecture that can process state are disclosed. This architecture can be used in a variety of methods including Single Driver DQN (SD-DQN), Multi Driver DQN (MD-DQN), actor critic (AC), and global policy evaluation. Further, this architecture can be extended to include idle driver repositioning actions.

In some embodiments, a first simulator (without repositioning) is disclosed. Dispatching may be described as sequential decision making. A few terms with respect to the first simulator are described below.

Problem:

Over the course of a time period (e.g., a day), riders (vehicle platform customers) request trips with a variety of start and end locations and prices (these are referred to as orders). The task is to assign drivers to customers to maximize expected cumulative reward.

States:

comprises (1) information about all currently unserved orders, (2) information about all active drivers (e.g., in a specific region such as a city), and/or (3) time of day. In one example, each order may be represented by a six-dimensional vector of: start location coordinates (two dimensions), end location coordinates (two dimensions), scalar price (one dimension), and scalar time waiting (one dimension). Each driver may be represented by a three-dimensional vector of: location coordinates (two dimensions) and a "steps left" scalar value (one dimension). If a driver is available, her location coordinates reflect its actual position, and steps left is set to zero. If the driver is dispatched to an order, the location coordinates will be the end coordinates of the order, and steps left will be the ETA (estimated time of arrival) to the end location. Time may be represented by a scalar value normalized to the interval [0, 1].

Actions:

At each decision point (which occurs when a driver becomes available), the system may assign that available driver to an order. Such an assignment constitutes an action. When a driver is assigned to an order, the driver now becomes unavailable until the end of the trip.

Rewards:

When an assignment is made, the environment produces a reward equal to the price of the selected order.

In some embodiments with respect to SD-DQN, the state is global. State transitions are driver-centric, which means that for a training sample $(s_t, a_t, r_t, s_{t+1})$, the next state $s_{t+1}$ corresponds to the global state when the driver assigned in state $s_t$ by action $a_t$ becomes available. The reward $r_t$ is the price of the order assigned by $a_t$. This approach can be viewed as independent Q-learning in a cooperative game.

In some embodiments with respect to MD-DQN, the state is global. State transitions are system-centric, which means that for a training sample $(s_t, a_t, r_t, s_{t+1})$, the next state $s_{t+1}$ corresponds to the global state when any new driver becomes available. The reward $r_t$ is the price of the order assigned by $a_t$. This approach treats the system as one large single-agent MDP.

Figure 3A:
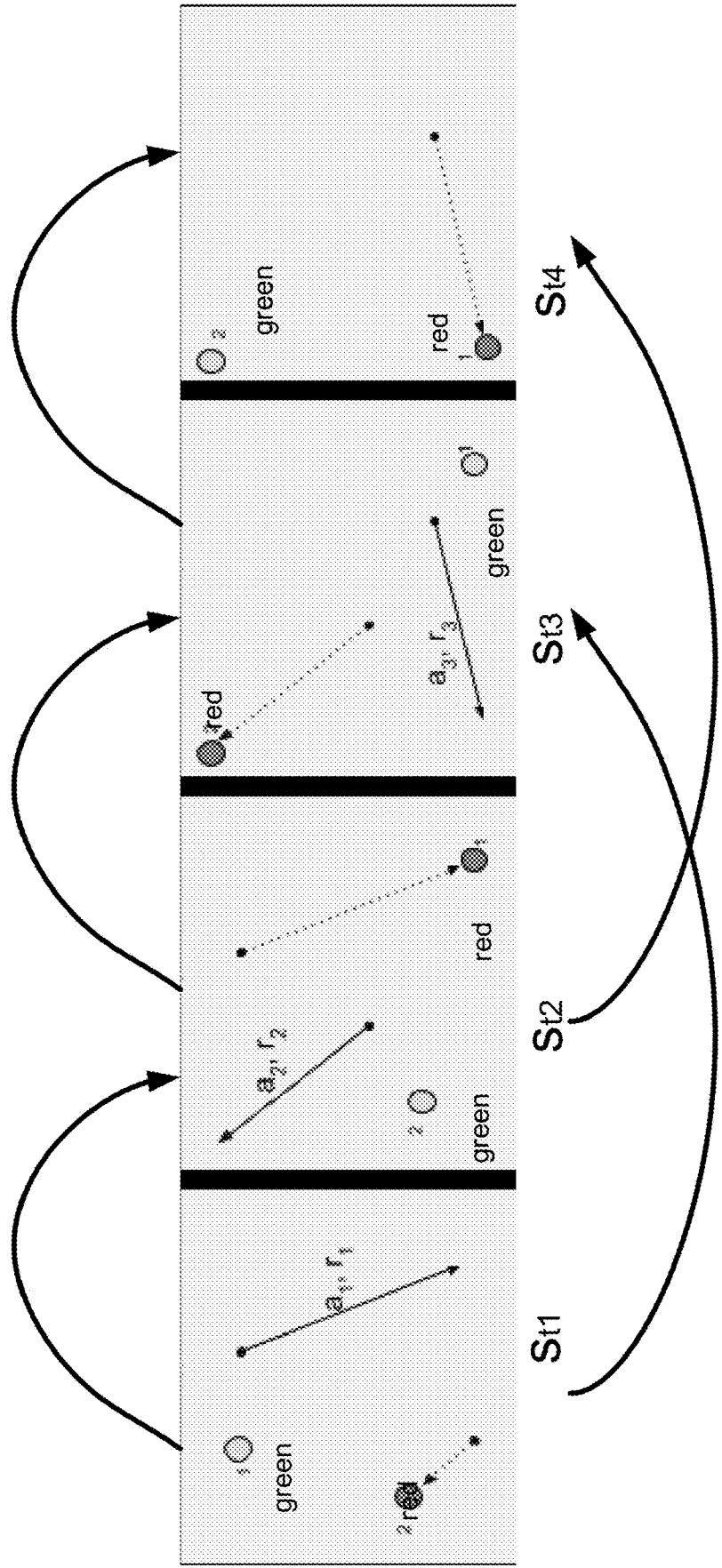
FIG. 3A illustrate exemplary state transitions for SD-DQN and MD-DQN, in accordance with various embodiments of the present disclosure.

FIG. 3A illustrate exemplary state transitions for SD-DQN and MD-DQN, in accordance with various embodiments of the present disclosure. FIG. 3A shows a length 4 trajectory in a two driver MDVDRP. The two drivers are labeled by dot "1" and dot "2." The currently available driver is in green, dispatched driver is red, and the order that the available driver accepts at time $t_i$ is $a_i$ and has price $r_i$. The accepted order at time $t_i$ is labeled by its action name and price $(a_i, r_i)$; and travels from the solid black dot to the terminal arrow. The transitions used in SD-DQN and MD-DQN are indicated respective arrows. An example of a SD-DQN transition is $(s_{t1}, a_1, r_1, s_{t3})$, which is driver-centric with respect to driver 1. The other arrow representing a SD-DQN transition is $(s_{t2}, a_2, r_2, s_{t4})$, which is driver-centric with respect to driver 2. An example of an MD-DQN transition is $(s_{t1}, a_1, r_1, s_{t2})$, which transitions from a state where driver 1 is available to a state where driver 2 is available. Though two drivers are shown, MD-DQN may apply to many more drivers. Thus, SD-DQN may follow a sequence of transitions of an individual driver, and MD-DQN may follow the transitions of multiple drivers to track the entire system. Accordingly, transition trajectory data may be formed to train the disclosed models. SD-DQN and MD-DQN may have similar inputs but follow different trajectories data.

In some embodiments, a second simulator (with repositioning) is disclosed. The second simulator includes the description of the first simulator and incorporates the broadcast distance (bd) parameter, which constrains the action space so that order/driver matches cannot exceed the bd. The bd imposes a constraint on the action space, so that only a subset of the driver-order pairs is eligible for matching. The matching from driver-order pairs is described below with respect to FIG. 3B. The constraint may be that only orders within a certain radius bd from a driver may be assigned to the driver. That is, the driver may have to be within the certain radium bd from the order to receive the order. The constraint is more realistic, reduces the size of action which makes the learning problem easier, and makes learning "safer" by bounding the maximum pickup distance.

In some embodiments, the second simulator accepts eight directional repositioning actions (front, rear left, right, front left, front right, rear left, rear right) and a wait action. These can be applied to drivers that have no orders within the broadcast distance. Repositions last for a maximal duration before the system requests a new action for the driver. During repositioning, a driver remains available for order assignment. Time advances in the simulator once all drivers are either assigned or repositioning.

Figure 3B:
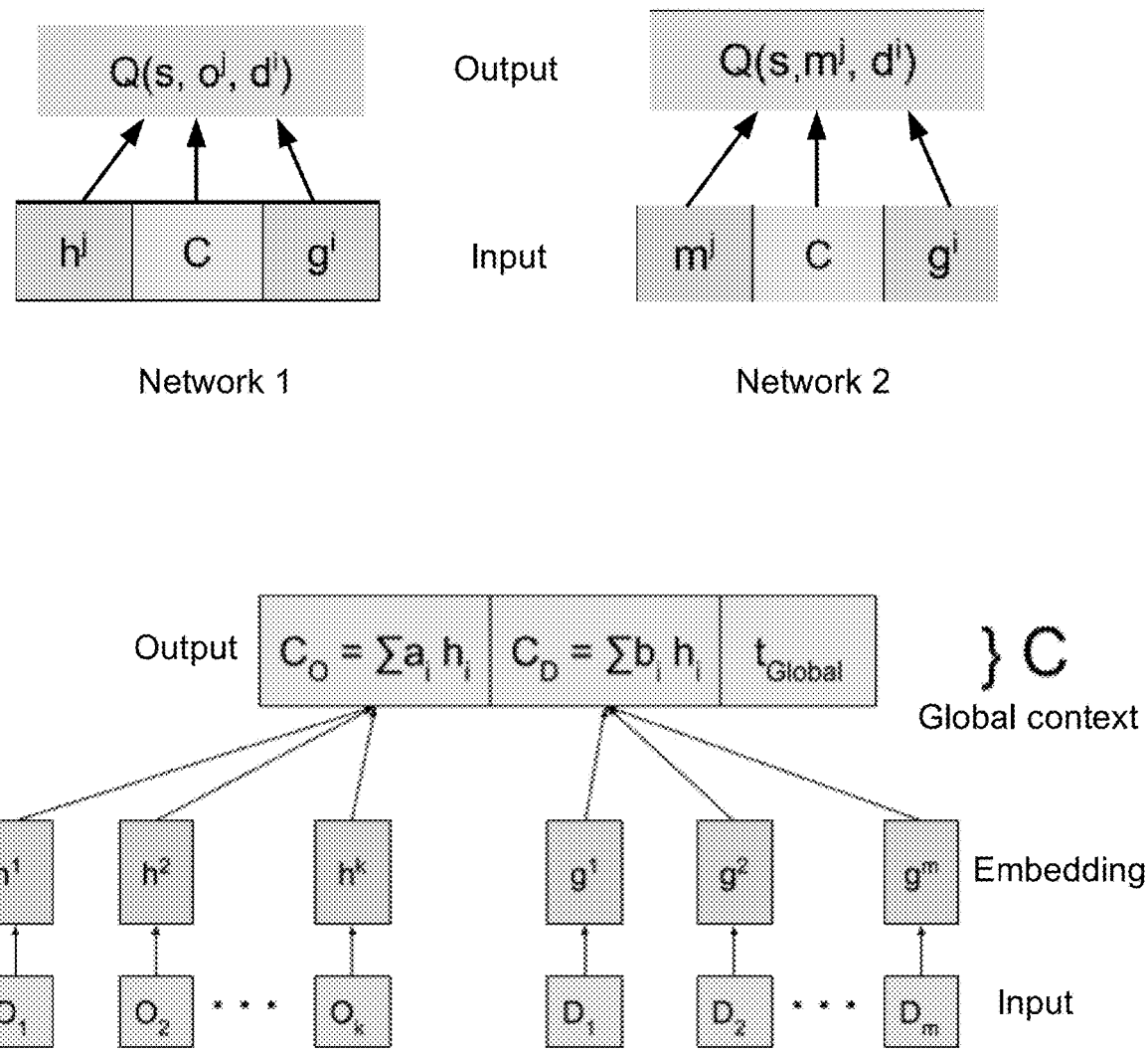
FIG. 3B illustrate an exemplary neural network architecture used in SD-DQN and MD-DQN, in accordance with various embodiments of the present disclosure.

FIG. 3B illustrate an exemplary neural network architecture used in SD-DQN and MD-DQN, in accordance with various embodiments of the present disclosure. In some embodiments, global context C may be computed using the attention mechanism over order and drivers. That is, order and driver embeddings are attended to for the global context C. Context vector C may represent the States described above. As shown, C may encode (1) information about all currently unserved orders $C_O$, (2) information about all active drivers $C_D$, and (3) time of day $t_{global}$. Input orders $O_i$ $(O_1, O_2, O_3, \ldots)$ respectively output to order embeddings $h^i$ $(h^1, h^2, h^3, \ldots)$. Together, inputs $h^i$ output to $C_O$. Input drivers $D_i$ $(D_1, D_2, D_3, \ldots)$ respectively output to driver embeddings $g^i$ $(g^1, g^2, g^3, \ldots)$. Together, inputs $g^i$ output to $C_D$. Vectors $h^i$ and $g^i$ may be learnable through neural network training. The embeddings respectively transfer the input vectors to output vectors. Drivers $(D_i)$ and orders $(O_i)$ are represented as short vectors of position, start, end locations, and are embedded into memory cells. This allows the use of variable length orders and drivers in the input. The global time is concatenated with the two separate order and driver contexts to obtain C. Further details for obtaining C are described below with respect to equation (2).

Above the global context C, FIG. 3B illustrates generalized representations of networks 1 and 2 for SD-DQN and MD-DQN. For simulator 1, network 1 may be used; and for simulator 2, networks 1 and 2 may be used. In some embodiments, network 1 uses global context C to query order/driver pairs and reposition/driver to produce Q-values for all possible actions. The output Q-value (Q( . . . )) for a certain driver and a certain action (represented by an order) may be obtained via a 2-layer network that takes concatenated driver embedding $g^i$, order embedding $h^i$, and global state C as input. Network 1 has inputs $h^j$, C, and $g^i$ and outputs to Q(s, $o^j$, $d^i$). Network 2 is similar to network 1 except that network 2 has inputs $m^j$, C, and $g^i$ and outputs to Q(s, $m^j$, $d^i$). Network 2 uses the global context C to query order/driver pairs and reposition/driver pairs to produce Q-values for all possible actions. Thus, a plurality of networks like network 1 and network 2 with different i-j pairs may be queried. Masking is applied to the Q-value calculation so that the network cannot select drivers that have already been dispatched. The maximum Q value may indicate a driver-order pair for the optimal current dispatching/repositioning decision. Thus, the driver associated with the maximum Q may be matched to the order associated with the maximum Q as a decision (dispatching or repositioning order). The generation of the decision from the above-described inputs (e.g., states comprising order and driver information) may be referred to as a policy.

Q-learning is a reinforcement learning technique which may be used in machine learning for the disclosed methods. The goal of Q-learning is to learn the policy, which tells an agent what dispatching or repositioning action to take under the current circumstances (states). Q-learning does not require a model of the environment and can handle problems with stochastic transitions and rewards, without requiring adaptations. For any finite Markov decision process (FMDP), Q-learning finds the policy that is optimal in the sense that it maximizes the expected value of the total reward over all successive steps, starting from the current state. Q-learning can identify an optimal action-selection policy for any given FMDP, given infinite exploration time and a partly-random policy. "Q" names the function (see networks 1 and 2 above) that returns the reward used to provide the reinforcement and can be said to stand for the "quality" of an action taken in a given state.

Reinforcement learning involves an agent, a set of states, and a set actions per state. By performing an action, the agent transitions from state to state. Executing an action in a specific state provides the agent with a reward (e.g., a numerical score). The goal of the agent is to maximize its total (future) reward. It does this by adding the maximum reward attainable from future states to the reward for achieving its current state, effectively influencing the current action by the potential future reward. This potential reward is a weighted sum of the expected values of the rewards of all future steps starting from the current state.

In deep neural networks (e.g., networks 1 and 2), neurons may serve as the basic building block. A neuron may receive an input signal (e.g., input data), process it using a logistic computation function, and transmit an output signal (e.g., output data) depending on the computation outcome. When these neurons are arranged into networks of neurons, they are termed as neural networks. Each column of neurons in the network is called a layer, and a network can have multiple layers with multiple neurons in each layer. Network with single neuron is called perceptron and network with multiple layers of neurons is called multi-layer perceptron (MLP). For example, for a two hidden layer MLPs (layer $A_1$ and layer $A_2$), the input layer comprises the inputs (state inputs and action inputs) to the network. The input layer is also called the visible layer because this may be the only exposed part of the network. Hidden layers derive features from the input layer at different scales or resolutions to form high-level features and output a value or a vector of values at the output layer. At each hidden layer, the network may compute the features as:

$A_1 = f(W_1 * X)$ $A_2 = f(W_2 * A_1)$ $Q = f(W_3 * A_2)$

Where, f is the function which takes the combination of weights (e.g., $W_1$, $W_2$, $W_3$) and outputs at the previous layer and outputs a value. Function f can be identical for all the hidden layers or can be different. $A_1$, $A_2$, and Q are the successive outputs of first hidden layer, second hidden layer, and the final output layer. For a given row of data X as an input to network, the network may process the input to obtain $A_1$, $A_2$ and finally obtain the predicted output Q. This can be called forward pass.

The weights of the neural network need to be updated by training to accurately reflect the decision-making process. In a regular DNN, the predicted output Q can be compared with an expected output (e.g., independently verified result, manually obtained result, cross-checked result) to compute an error using a loss function. This error is then propagated back through the network using a backpropagation algorithm to update the weights $W_1$, $W_2$, $W_3$ for each layer according to stochastic gradient descent, one layer at a time. This can be called backward pass.

Figure 3C:
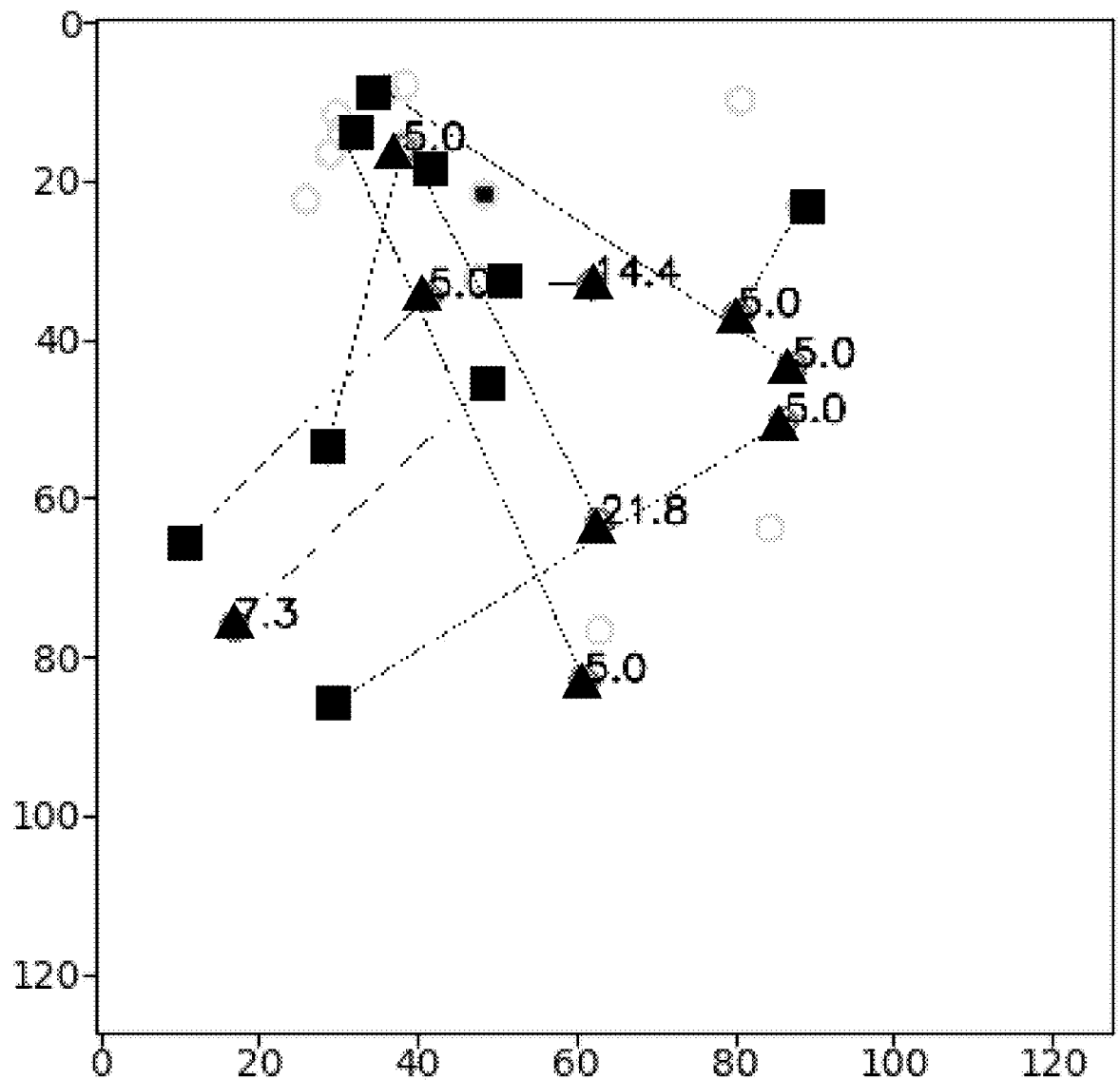
FIG. 3C illustrates a visual representation of an exemplary dispatching state, in accordance with various embodiments of the present disclosure.

In the context of this disclosure, the machine learning algorithm or a system or device that at least partially implements the machine learning algorithm may be referred to as an "agent," which may simulate one or more drivers, and the states, actions, and rewards are described above. For example, FIG. 3C illustrates a visual representation of an exemplary dispatching state, in accordance with various embodiments of the present disclosure. Circles represent drivers. The black centered circle represents the driver located at position (50, 20) who is available, and all other drivers are dispatched. Orders start at triangles and end at the connected square dots respectively. Order prices are denoted above their pickup location at the triangles.

For SD-DQN, the Q-value function of global state for single drivers may accumulate rewards along single-driver trajectories. For SD-DQN, the Q-value function may accumulate rewards for all drivers. This Q value function can show how good a decision (dispatching or repositioning) made at a particular location and time of the day with respect to the long-term objective of maximizing total income. For training, the agent interacts with the environment in discrete steps. At each step, the agent executes an action (e.g., re-positioning or accepting a ride order), and correspondingly from the environment, the agent receives an observation (e.g., a reward and a next state described below). That is, the agent chooses an action from a set of available actions, and the agent moves to a new state, and the reward associated with the transition (e.g., a ride fee for fulfilling a ride order, nothing for waiting) is determined. In one exemplary transition, the driver is matched to a trip order, spends time to travel to the trip origin location, and the trip moves the driver to the destination location and time, for which the driver earns an immediate reward (trip fee) from this transition. The goal of the agent is to collect as much reward as possible. Assuming that the vehicle driver follows the determination of the agent, and over time through reinforcement learning algorithm, the agent can learn to reproduce that behavior to maximize the rewards and help the vehicle driver make the best decisions.

With the overview discussed above, SD-DQN and MD-DQN are described in more details below. In various embodiments with respect to an overview of the disclosed neural network, at time t, there is a collection of orders $O_t^i \in \emptyset_t$, drivers $d_t^i \in D_t$, and subset $D_t^{avail} \in D_t$ of available drivers. A driver is available if not currently serving an order. The state is given to the neural network as $s_t = (\emptyset_t, D_t, D_t^{avail}, t)$.

In various embodiments with respect to input representation, the exact vector representation of $O_t^i$ and $d_t^j$ depend on the environment. In MDVDRP, orders may be given as six-dimensional vectors comprising starting x position, starting y position, ending x position, ending y position, price, and time waiting, where time waiting is the difference between the current time and the time that the order first began requesting a driver. A driver may be represented by a six-dimensional vector: an x position, y position, time to completion, repositioning x and y coordinates, and reposition counter. If the driver is available, her x and y position are given by her actual location, and time to completion is 0. If the driver is not available, the x and y position are the ending location of the order the driver is servicing, and the time to completion is the time it will take to finish the order. If a driver is repositioning, the direction of repositioning is reflected in the repositioning coordinates, and reposition counter counts down from the maximum repositioning time.

In various embodiments with respect to embedding and global context, the neural network may embed orders $\{O_t^i\}_i$ and drivers $\{d_t^j\}_j$ into memory cells $\{h_t^i\}_i$ and $\{g_t^j\}_j$ respectively. Then, the neural network may perform a single round of attention over each to produce a global order context $C_t^O$ and global driver context $C_t^D$. These contexts as well as the global time are concatenated to produce a global context vector $C_t^G$, which is the system's internal global representation of state.

In various embodiments with respect to action-value determination, the neural network may compute two types of Q-values: those for driver-order pairs and those for driver-reposition pairs. Each of these two processes can be viewed as their own attention mechanisms over pairs, with the attention coefficients interpreted as Q-values. For example, a small fully connected neural network $Att_o$ such that $Q(s_t, d_t^j, O_t^i) = Att_o(C_t, g_t^j, h_t^i)$ may be constructed for available driver-order pairs. Similarly, for available driver-reposition pairs, another small neural network $Att_r$ such that $Q(s_t, d_t^j, m_t^i) = Att_r(C_t, g_t^j, m_t^i)$ may be constructed, where $m_t^i$ is a vector representation of a reposition action. In some embodiments with respect to experiments, there are 9 reposition actions comprising 8 cardinal directions and a stationary action (no movement). The $m_t^i$ can be represented as one-hot vectors.

In various embodiments with respect to single-driver and multi-driver Q-values, two methods can be taken to train the above network: single-driver DQN (SD-DQN) and multi-driver DQN (MD-DQN). Each can be viewed as a 1-step bootstrapping approach like in the standard DQN, but the two methods may differ from one another in the form of one step data that is given to the network. As a result, the learned Q-values in each approach may have distinct semantics.

In some embodiments with respect to SD-DQN, driver-centric transitions may be used. At time t, the system is in global state $s_t = (\emptyset_t, D_t, D_t^{avail}, t)$ and a driver-order or driver-reposition action is selected, yielding reward $r_t$. Let d be the selected driver, and $a_t$ denote the action. Then, dispatching and repositioning decisions may be made for other drivers as they become available, until eventually driver d is available again in state $s_{t'} = (\emptyset_{t'}, D_{t'}, D_{t'}^{avail}, t')$. The change in time t'−t is the time it takes for driver d to complete a single trip, which is typically between 10 and 30 minutes. In SD-DQN, this yields a transition $(s_t, a_t^i, r_t, s_{t'})$. To train the neural network in the SD-DQN setting, the outputs of the network are updated using the target:

$$\hat{Q}(s_t, a; \theta_t) = r_t + \gamma^{t'-t} \cdot \max_a Q^T(s_{t'}, a'; \theta_t') \qquad (1)$$

where $\theta_t$ are the current network weights and $\theta_t'$ are the weights of the target network, which are slow updating weights that sync with the network's current weights at fixed intervals. $\gamma$ is a discount factor. To account for the fact that transitions occur over a variable time interval, future value is discounted continuously with the discount factor $\gamma$. The network is trained to reduce the Huber loss between $\hat{Q}(s_t, O_t^i)$ and $Q(s_t, O_t^i)$. SD-DQN updates the network towards driver-centric Q-values, accounting for the discounted return associated to a single driver. These driver-centric transitions may be accumulated from each driver.

In some embodiments with respect to MD-DQN, system-centric transitions may be used. At time t, the system is in global state $s_t = (\emptyset_t, D_t, D_t^{avail}, t)$ and order $O_t^i$ is selected for driver $d_t^i$, yielding reward $r_t$. When the next driver becomes available, the state transitions to $s_{t'} = (\emptyset_{t'}, D_{t'}, D_{t'}^{avail}, t')$. In contrast to the SD-DQN transition, the change in time t'−t is the time it takes for the next available driver to appear, which can be, for example, on the order of fractions of a second in large cities. As in the SD-DQN case, this yields a 1-step transition $(s_t, O_t^i, r_t, s_{t'})$. The same target and update procedure from equation (1) may be used, but with this different state transition as input data. MD-DQN will update the network towards a global, system-centric Q-value that accumulates discounted returns across all drivers. Ignoring issues related to function approximation, MD-DQN provides the correct learning signal for solving the MDVDRP.

In some embodiments with respect to architecture details, to ease notation, in the following until the description of empirical results, the subscript t that had denoted time above is omitted. Memory embedding starts with a global state s comprising orders, drivers, and time. All orders and drivers are both embedded into length 128 memory cells using a one-layer network with 128 output units followed by RELU (rectified linear unit) nonlinearities. With respect to attention for global context, given a set of N order memories $h^i$ and M driver memories $g^j$, the attention mechanism for orders/drivers are given by the following equations:

$$C^O = \sum_{i=1}^{N} a_i h^i, \qquad (2)$$

$$C^D = \sum_{j=1}^{M} b_j g^j$$

where $a_i = \sigma(v_o \cdot \tanh(W^O \cdot h^i)), b_j = \sigma(v_d \cdot \tanh(W^D \cdot g^j)) \qquad (3)$ and $\sigma$ is a sigmoid activation function, $W^O$ and $W^D$ are 128-dimensional square matrices, and $v^O$ and $v^D$ are 128-dimensional vectors so that $a_i$ and $b_j$ are scalars. Coefficients/weights $a_i$ and $b_j$ are learnable through neural network training. Both W and v are trainable.

The two contexts $C^O$ and $C^D$ may be concatenated along with the episode time t to produce a 257-dimensional global context vector:

$$C_G = [C_o | C_d | t] \qquad (4)$$

In some embodiments with respect to Q-values, to compute a driver-order Q-value $Q(s, d^j, o^i)$, the global context may be concatenated with the order's memory embedding $h^i$ and driver's memory embedding g' to pass through a fully connected layer with 64 units and RELU activation, and finally to a single linear unit. The same network architecture may be used for driver-repositioning pairs, but weights may not be shared between the driver-order network and driver-repositioning network.

In some embodiments, a replay memory initialized with random behavior transitions and a target network are used. The size of the replay memory and how frequently the target network is synced are both environment dependent and will be described in further details below. During training, each training loop may begin by taking one step in the environment. Behavior is $\epsilon$-greedy with respect to the network's Q-values. $\epsilon$ is linearly annealed and is specified below. For both SD-DQN and MD-DQN, one environment step may generate a one-step transition appended to the replay memory (though they differ in what the one-step transition is). Target network may be updated every 100 training steps. Gradient clipping may be used to stabilize training. Then, a batch of 32 transitions may be sampled from replay memory, and a Q-value update may be performed using formula (1), and γ=0.99. For example, the experiments may be trained using the Tensorflow implementation of RMSProp with gradients clipped at 100.

Exemplary results for evaluating the disclosed methods may be presented in table format. Entries with error bars are provided in tables below. The learning method (SD-DQN or MD-DQN) may run four times, with each experiment differing in the random seed. For each run, once learning has appeared to converge, the reward, pickup distance, and order served percentages over 20 episodes may be averaged. The average and error bars may be computed across the four runs. If no error bars are included, this means that the table is showing results over a single run with entries averaged over 20 episodes.

The assignment problem is a combinatorial optimization problem defined by a cost matrix, where the $ij^{th}$ entry represents the cost of assigning the $i^{th}$ row object to the $j^{th}$ column object. The goal is to produce an assignment that minimizes the sum of costs. In the context of driver assignment, the assignment cost is given by the Euclidean distance between order $o^i$ and driver $d^j$. The assignment problem may be the core subproblem for a dispatching problem with fixed windowing and a distance-minimization objective. An episode is initialized by a uniform random distribution of k orders and k drivers over the unit square. At each step, a random driver is chosen, and the agent selects an order to match with the given driver. The reward associated to this action is the negative Euclidean distance between the driver-order pair. Discounting may not be performed due to the static nature of the problem.

In some embodiments, the assignment problem is a particularly good environment for demonstrating the potential miscoordination of SD-DQN. For the single-driver approach, each transition ends in a terminal state, such that Q-learning reduces to one step reward prediction. Therefore, a policy which is greedy with respect to single driver Q-values may become suboptimal, since it does not learn any coordination between drivers. On the other hand, the MD-DQN is concerned with maximizing the aggregate return across all drivers, and so is capable of learning a better policy.

In some embodiments, SD-DQN and MD-DQN are trained in the k=20 assignment problem. The ε-exploration is annealed linearly over 10,000 episodes from 1.0 to 0.03, and the target network is updated every 500 training steps. The replay buffer maintains the 10000 most recent transitions and is initialized with 5000 samples. A learning rate of 0.001 may be used. Unlike the following domains, the reward function is given as the negative Euclidean distance between the selected driver-order pair.

Results are summarized in Table 1, in which the total distance traveled (e.g., the sum of the distances of all assignments) for SD-DQN and MD-DQN when there are 20 orders and 20 drivers are shown. SD-DQN and MD-DQN are compared to optimal solutions as well as random assignments.

TABLE 1

20 driver 20 order static assignment problem

| Policy | Total pickup distance |
| --- | --- |
| Random | 10.25 |
| SD-DQN | 4.83 ± 0.06 |
| MD-DQN | 4.12 ± 0.03 |
| Optimal | 3.82 |

In some embodiments with respect to the dynamic multi-driver dispatching, orders/actions that must be served are known at the start of an episode in the assignment problem. In the dynamic setting, these orders arrive at different times throughout an episode. Additionally, with focus on ridesharing, orders are defined by pickup and drop-off locations. When a driver is assigned to an order, she may navigate to the pickup location and then travel to the drop-off location. Results are first presented on small domains where myopic policies are demonstrably suboptimal. Then, the SD-DQN and MD-DQN approaches are applied to a large-scale dispatching simulator derived from real-world historical vehicle platform data.

In some embodiments with respect to illustrative domains with no repositioning, a simple dispatching simulator is used to show that both SD-DQN and MD-DQN can learn good policies in two key scenarios where myopic behavior fails. In these domains, at the start of a new episode, drivers are all located at a "dispatching depot" at position [0,5; 0,5]. Drivers travel at a constant speed of 0.1, and travel along straight lines from their initial position to the order pickup location, and then from the order pickup to the order drop-off location. Order arrivals are generated according to a Poisson distribution, with controllable parameter K. In the following experiments, K is set to either 3 or 10 (that is, average order arrivals per unit time are either 3 or 10) to simulate "low demand" and "high demand" environments. The pickup and drop-off locations as well as the reward for an order are specified below for two different environment settings. An episode lasts 5000 timesteps.

The Surge domain illustrates an explicit, temporal effect caused by order pricing that cannot be exploited by myopic dispatchers. In some embodiments, in the Surge domain, there are three regions: left, center, and right. One quarter of all orders go from the center to the upper-left region, one quarter from center to bottom-right, one quarter from upper-left to center, and one quarter from bottom-right to center. All orders yield a reward of 2 except those that go from right to center, which yield a reward of 4. For this domain, the best policy first assigns drivers to travel to the bottom-right region, and once they are there, assigns them to the bonus reward trips back from right to center. A policy that minimizes the pickup distance will fail to value trips to the bottom-right more than trips to top-left, and therefore yield suboptimal behavior. On the other hand, a policy which is greedy with respect to rewards will always select the bonus order regardless of driver location. In effect, this policies "skips" the price 2 order that will ferry a driver out to the bottom-right region and is therefore also suboptimal.

Figure 3D:
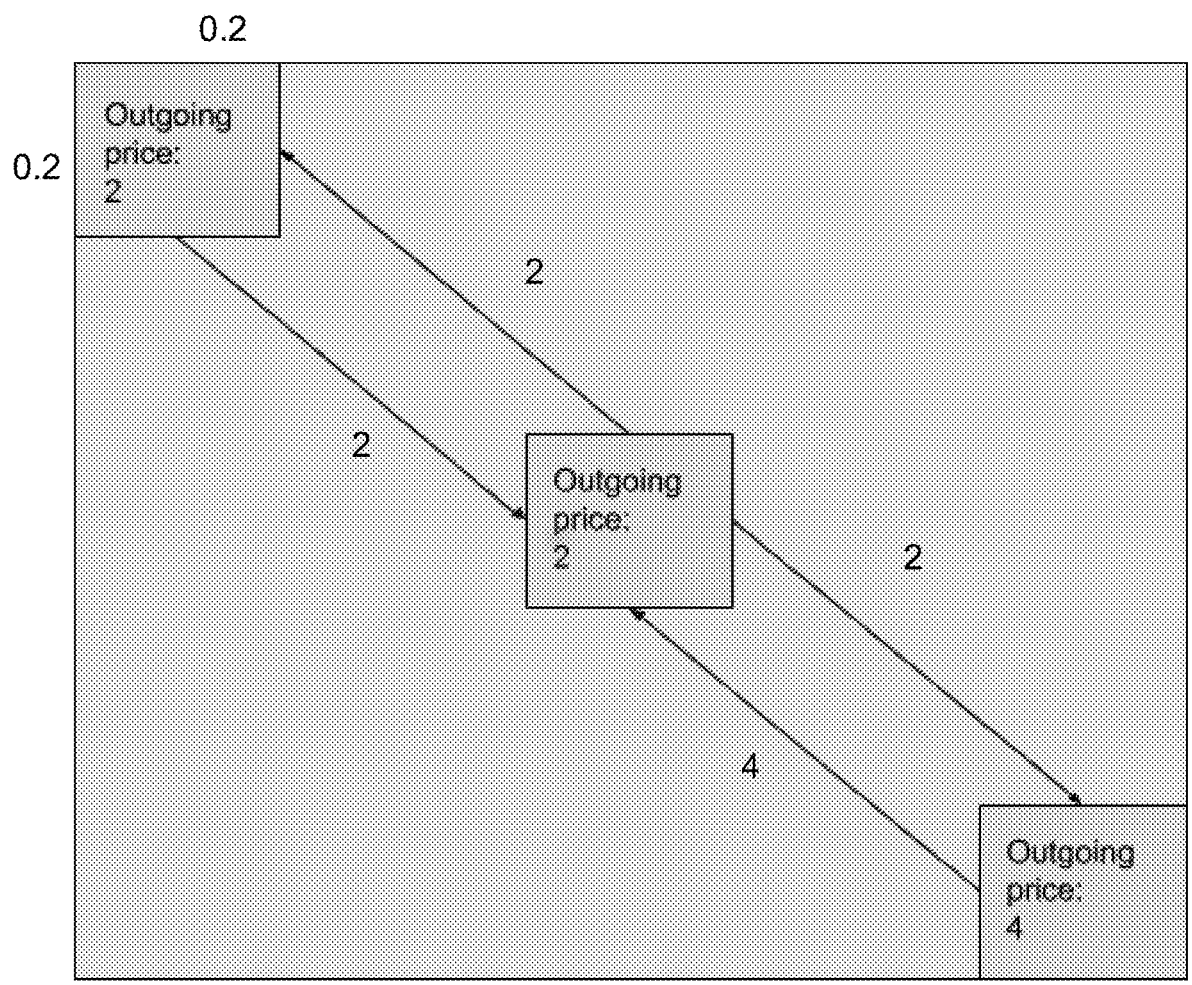
FIG. 3D illustrates a Surge domain, in accordance with various embodiments of the present disclosure.

FIG. 3D illustrates a Surge domain, in accordance with various embodiments of the present disclosure. In some embodiments, orders start equally in and travel between the three red squares. Those at the corners return to center, those at the center are split equally going to both corners. Orders disappear after 5 timesteps and will wait indefinitely once assigned. Each square is labeled with its outgoing order value. Within each square, order start and end locations are generated uniformly randomly. Within an area, position is sampled uniformly at random. In one example, price may be 2 or 4 as shown. There are 20 drivers, all start at (0.5, 0.5). Speed is 0.1 units per timestep. No idle movement is allowed. General environment features include: board is [0,1]×[0,1] and the horizon is 200 timesteps.

In the Surge domain, the advantage of traveling to the bottom right region may include that it is directly tied to the price of orders found in that region (4 vs 2). In the Hot/Cold domain, the agent may learn a subtler advantage. Order pickup locations are located uniformly along the top edge of the unit square, called the "hot region." Half of the orders end uniformly along the bottom edge of the unit square, called the "cold region" and half end uniformly in the hot region. Order price is given by the Euclidean distance from order pickup to order drop-off locations. The hot region can be thought of as a busy area of downtown, while the cold region represents surrounding suburbs. Despite orders to the cold region having higher price (since they are longer), it is generally more advantageous for drivers to stay in the hot region, since they can quickly pick up new orders. In other words, the advantage is entirely temporal.

Figure 3E:
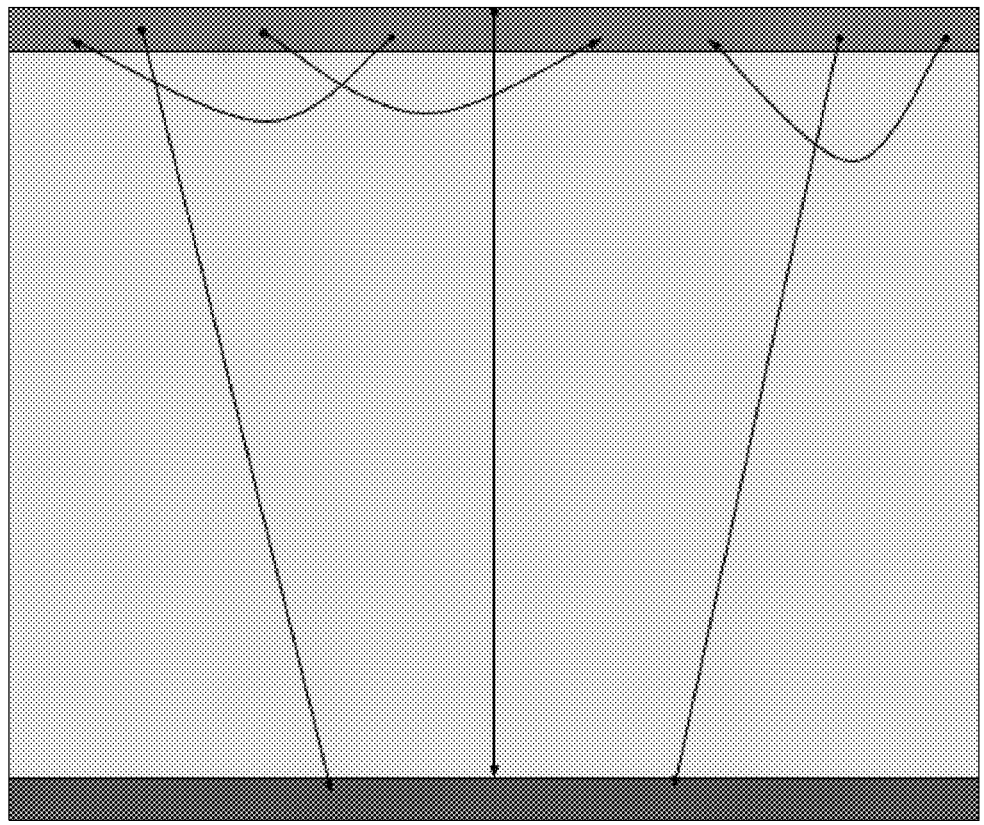
In FIG. 3E illustrates a Hot/Cold domain, in accordance with various embodiments of the present disclosure.

FIG. 3E illustrates a Hot/Cold domain, in accordance with various embodiments of the present disclosure. In some embodiments, orders only start in hot region, where their positions may be generated uniformly and randomly. For the destination, a fair coin is flipped to decide whether the order ends in hot or cold, and then the exact position is sampled uniformly randomly in the designated region. That is, half of the orders may end in hot, and the other half end in cold. Orders disappear after 5 timesteps and will wait indefinitely once assigned. Price is the Euclidean distance. There are 20 drivers, all start at (0.5, 0.5). Speed is 0.1 units per timestep. No idle movement is allowed. General environment features include: board is [0,1]×[0,1] and the horizon is 200 timesteps.

In some embodiments, for SD-DQN, a size 20000 replay buffer is used, the learning rate 0.001, and $\epsilon$-exploration may be annealed linearly over 100 episodes. The target network may be updated every 500 training updates, and a training update may be performed every environment step. For MD-DQN, a size 20000 20-step Q-learning, a learning rate of 0.0001, and annealed $\epsilon$-exploration linearly over 100 episodes may be used. In one example, SD-DQN is trained with 1-step Q-learning, and exploration is annealed linearly from 1.0 to 0.03 over 1 million environment steps. MD-DQN is trained with 20-step Q-learning, and exploration is annealed linearly from 1.0 to 0.03 over 2 million environment steps.

SD-DQN and MD-DQN may be compared with three other algorithms: myopic revenue maximization (MRM), myopic pickup distance minimization (MPDM), and local policy improvement (LPI). MRM always assigns the highest value order to an available driver so as to maximize the sum of order prices for the assignment, breaking ties with wait time minimization. MRM can be accomplished by running the Kuhn-Munkres algorithm on an altered (# drivers)×(# orders) matrix. MRM can potentially send drivers very far to pick up only marginally more valuable orders. MPDM always assigns the closest order to an available driver. to minimize the sum of pickup distances for the assignment. MPDM can be accomplished by running the Kuhn-Munkres algorithm on the (# drivers)×(# orders) pickup distance matrix. MPDM may work when there are enough drivers to satisfy most orders and order price is closely tied to trip distance. LPI may discretize the environment into a 20×20× 144 spatiotemporal grid and perform tabular TD(0). Average revenue, pickup distance, and served percentages with error bars over 100 episodes are provided in Table 2 and Table 3. Each episode lasts 5000 time units, which allows each driver to serve approximately 1000 orders.

TABLE 2

Surge Domain

| | Low Demand | | | High Demand | | |
|---|---|---|---|---|---|---|
| Algorithm | Revenue | Pickup distance | Served % | Revenue | Pickup distance | Served % |
| MRM | 29447 | 0.33 | 73.6 | 35939 | 0.54 | 18.1 |
| MPDM | 32279 | 0.178 | 86.3 | 42842 | 0.016 | 34.2 |
| LPI | 31112 | 0.245 | 80.0 | 50147 | 0.046 | 33.6 |
| SD-DQN | 31860 ± 448 | 0.279 ± 0.0005 | 78.2 ± 0.19 | 50323 ± 9 | 0.045 ± 0.02 | 33.54 ± 0.09 |
| MD-DQN | 33700 ± 225 | 0.177 ± 0.0001 | 88.23 ± 0.28 | 49031 ± 13 | 0.056 ± 0.0012 | 32.79 ± 0.05 |

TABLE 3

Hot/Cold Domain

| | Low Demand | | | High Demand | | |
|---|---|---|---|---|---|---|
| Algorithm | Revenue | Pickup distance | Served % | Revenue | Pickup distance | Served % |
| MRM | 50953 | 1.04 | 31.5 | 52094 | 1.11 | 8.7 |
| MPDM | 56546 | 0.535 | 53.8 | 58287 | 0.508 | 16.5 |
| LPI | 58173 | 0.45 | 60.64 | 76840 | 0.1545 | 30.06 |
| SD-DQN | 58580 ± 124 | 0.4609 ± 0.007 | 59.26 ± 0.13 | 78552 ± 21 | 0.1108 ± 0.003 | 39.25 ± 0.04 |
| MD-DQN | 58893 ± 181 | 0.5158 ± 0.008 | 52.97 ± 0.027 | 78860 ± 29 | 0.111 ± 0.012 | 33.625 ± 1.16 |

In some embodiments, the disclosed methods may be implemented on domains where drivers can both be dispatched and repositioned. The first such environment is the same as the previous Hot/Cold domain, except that a broadcasting radius $d_{bcast}$ is imposed on drivers. This means that drivers may only pair with orders if they are within $d_{bcast}$ units of the driver. Otherwise, the driver may only take a repositioning action. If a driver matches to an order that ends in the cold region, the agent may learn to reposition that driver from the cold region towards the hot region, so they can pair with additional orders. Orders are represented by six-dimensional vector as before. Drivers are represented by six-dimensional vector. First three values are location coordinates and steps left (as before). Last 3 values are repositioning direction (2) and reposition steps left (1). If the driver is not repositioning, all of these values are set to zero. Time is represented by a scalar value normalized to the interval [0, 1]. As with the dispatch-only experiments, results for high and low demand regimes are represented in Table 4. Myopic strategies with random repositioning (MPDM-random and MRM-random) are baseline models for comparison. This means that available drivers that cannot be assigned to any orders reposition in a random sequence until they are within broadcast distance of an order.

TABLE 4

Hot/Cold with repositioning

| | Low Demand | | | High Demand | | |
|---|---|---|---|---|---|---|
| Algorithm | Revenue | Pickup distance | Served % | Revenue | Pickup distance | Served % |
| MRM-random | 932 | 0.199 | 4.2 | 911 | 0.177 | 1.8 |
| MPDM-random | 939 | 0.174 | 8.1 | 936 | 0.161 | 2.5 |
| MRM-demand | 4861 | 0.18 | 34.1 | 4902 | 0.178 | 8.1 |
| MPDM-demand | 5234 | 0.1624 | 53.2 | 5644 | 0.164 | 15.9 |
| SD-DQN | 5478 ± 188 | 0.1615 ± 0.03 | 57.5 ± 0.31 | 7387 ± 41 | 0.0781 ± 0.008 | 33.8 ± 0.43 |
| MD-DQN | 5717 ± 213 | 0.1879 ± 0.05 | 54.5 ± 0.25 | 7309 ± 56 | 0.1519 ± 0.04 | 24.2 ± 0.22 |

In some embodiments, hot/cold with repositioning tests an important aspect of learning: the ability of MD-DQN and SD-DQN agents to reposition drivers to locations where they can pick up new orders. However, this repositioning behavior may be uniform across drivers. Thus, the agent can reposition drivers in the same manner (e.g., if in the cold region, go to the hot region).

To test whether the disclosed methods can learn non-uniform repositioning behavior, a class of "distribution environments" is introduced where drivers must learn to reposition so as to match their spatial distribution with a fixed future order distribution. A distribution domain operates in two phases. In the first phase, the environment resets with k drivers and no orders in the system, so drivers may only reposition during this phase. In the second phase, k orders appear according to a fixed spatial distribution, and drivers can match to orders if they are within a given broadcast radius $d_{bcast}$. The second phase lasts long enough to allow drivers to reposition one more time before all orders cancel and the environment is reset. The reward function may be altered so that each order matching action receives +1 reward. Order destinations may be far away from start locations so that each driver may serve one order per episode. As a result, the episodic return is proportional to the number of orders served, so the episode score may be interpreted as a measure of how well the agent arranges driver supply in phase 1 with order demand in phase 2.

Figure 3F:
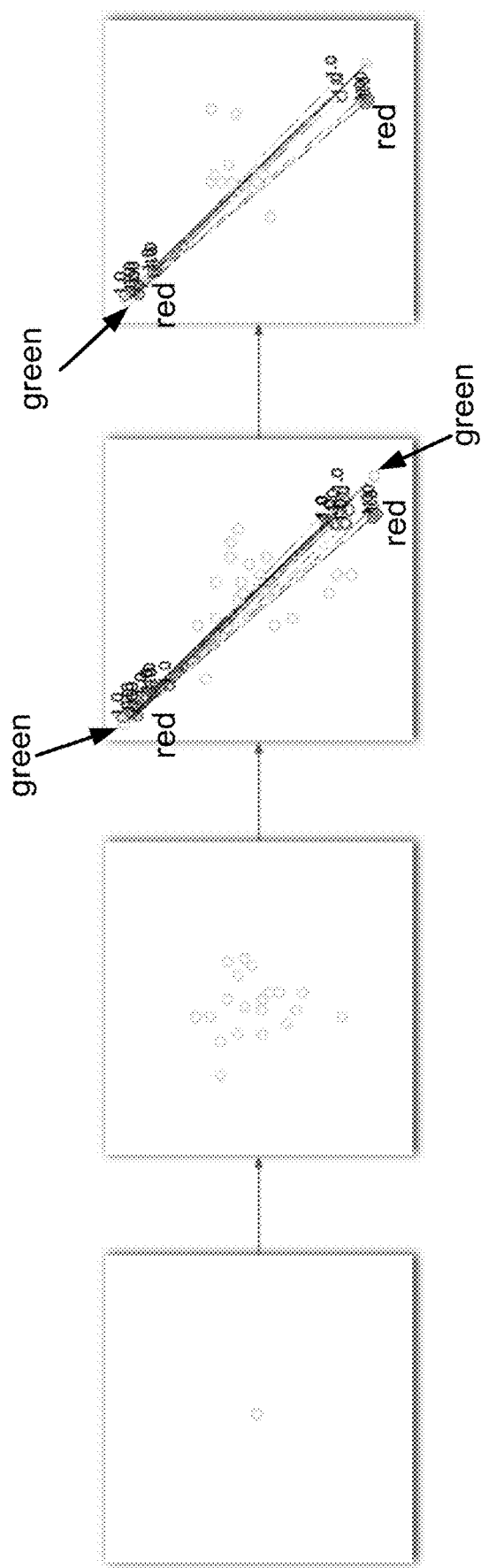
FIG. 3F illustrates a Distribute domain, in accordance with various embodiments of the present disclosure.

FIG. 3F illustrates a Distribute domain, in accordance with various embodiments of the present disclosure. The Distribute domain may illustrate the optimality of repositioning. In various embodiments, drivers begin in the center of the region. They then have 5 steps to reposition. At the 6th timestep, orders appear in the two corners. The distribution of orders may comprise two small patches in the top left and bottom right parts of the unit square. The order start locations are sampled uniformly within each patch. Drivers that are within 0.3 units of an order start (red circle) are assigned.

All orders end in the opposing corner's green dot. This way, trips are long enough that a single driver can only satisfy one order per episode. After two timesteps, all remaining orders cancel and the environment resets. The total number of orders in each patch is fixed across episodes and denoted fractionally. In the above example, there are 20 drivers, and the order demand is split 50/50 between the two corners. Some experiments will have imbalanced demand, such as 80/20, meaning 16 orders arrive in the top corner and 4 in the bottom corner. But, in all experiments, the number of drivers equals the number of orders. In the disclosed architecture, lots of weight sharing happen on the action selection mechanism. Initially drivers are in identical positions. Therefore, only the global context may prevent the drivers from giving the same action the same Q-value. Empirically in both Q-learning, "diagonal" policies are observed, that is, policies drivers take identical actions. This settles the final behavior in a local optimum (all go to one side). In the Q-learners, this may be overcome with a longer period of high exploration (e.g., annealing to 20% and keeping it there). A positive view of this environment is that success in it guarantees that the global context vector is carrying key information.

Results for 20-driver Distribute domains are shown in Table 5. The optimal served percentage (which is 100%) and the "uniform optimal" served percentage are included. This quantity reflects the maximum score one can obtain if the repositioning behavior is uniform across drivers. SD-DQN and MD-DQN are able to get near optimal test scores when the demand is balanced. In the 80/20 task, SD-DQN was able to escape the uniform optimum. For all experiments, sustained high exploration may be allowed. For example, an ϵ-greedy behavior policy may be used where E is linearly annealed epsilon from 1.0 to 0.2 over the first 1000 episodes. Test performance is averaged over 10 episodes. Also, each experiment may run 4 times changing only the random seeds.

TABLE 5

Distribute domain with 20 drivers

| Algorithm | 50/50 Served % | 80/20 Served % |
|---|---|---|
| Optimal | 100% | 100% |
| Uniform Optimal | 50% | 80% |
| SD-DQN | 96 ± 0.13% | 92 ± 0.72% |
| MD-DQN | 95 ± 0.11% | 80 ± 3.42% |

In some embodiments, the Distribute domain may be used to test the saliency of global state information in the learning process of SD-DQN. Traditionally, independent learning in games assumes that agents do not have knowledge of other agents' actions at decision time, and that they only have a partial view of state. In contrast, SD-DQN receives full state information as input. The salience of global state is demonstrated through a small Distribute domain in which there are 4 drivers and a 75/25 split, i.e., 3 orders appear in one region and 1 order appears in the other. Then, SD-DQN is trained with and without the inclusion of global context. Without global context, the network becomes stuck in the uniform optimal strategy that sends all drivers to the three-order region.

In some embodiments, the disclosed methods may be tested in more realistic dispatching environments. The first of these may be referred as the historical statistics domain, because it derives random order and driver generation parameters from historical data. This first realistic simulator does not include repositioning. In one example, 30 days of dispatching data from a historical vehicle platform dataset may be used, which contains spatial and temporal information for tens of millions of trips in one of the largest cities. To build the simulator from this data, the city may be covered in a 20 by 20 square grid, and Poisson parameters $\kappa_{x,y,t}$ may be extracted where x is an order start tile, y is an order end tile, and t is the time of day in hours. This results in 400×400×24=3.84 million parameters to specify an order generation process. In addition, the average ETA (estimated time of arrival) as well as its variance may be extracted for each (x, y, t) triple. When a driver is assigned to an order, the simulator computes a Gaussian sample (e.g., using the historical mean and variance) of the ETA $t_1$ from the driver's position to the order's start location, and another sample of the ETA $t_2$ for the order's start location to the order's end location. The driver will become available at the order's end location in time $t_1+t_2$. Orders price is equal to max(5, $t_2$), where $t_2$ is given in minutes. Driver entry and exit parameters are also derived from data. For each tile-hour triple (x, y, t), the Poisson parameter may be computed from driver arrival, and the duration that the driver remains in the system is given by a Poisson parameter that is a function only of t.

With the 30 days of real trip data, the following are estimated: order generation parameters for geospatial regions (20×20×24 numbers); trip ETA mean and variance from region pairs at each hour (2×20×20×20×20×24 numbers); and driver online/offline event parameters (20×20×24 numbers). For each episode, the order generation parameters are used to create a full set of orders to appear throughout the day. Drivers enter the system according to online event parameters and exist for a sampled duration. When a trip is selected, ETA is sampled from a normal distribution. Simulator is "scaled" by multiplying order generation, driver online event, and driver offline event parameters by a constant factor.

The scale of the MDVDRP may be controlled via a scaling parameter 0<λ≤1. All order and driver generation parameters are multiplied by λ. For example, a 1% scaled environment means that all generation parameters are multiplied by 0.01. Table 6 and Table 7 provide three scale regimes: 0.1%, 1%, and 10%. For 0.1% and 1%, values with standard errors are reported across 100 episodes, and for 10%, values with standard error across 10 episodes are reported.

In some embodiments, SD-DQN is trained with 1-step Q-learning, and exploration is annealed linearly from 1.0 to 0.03. MD-DQN is trained with 20-step Q-learning, and exploration is annealed linearly from 1.0 to 0.03 over 2 million environment steps. For both SD-DQN and MD-DQN, the following are employed: a replay buffer, target network, reward scaling, and gradient clipping to stabilize training. For SD-DQN, a batch size of 32 and 0.99 discount factor are used. MD-DQN is run at 0.1% with a large hyperparameter search over discount factor, learning rate, gradient clipping, target update frequency, and epsilon anneal rate.

TABLE 6

0.1% and 1% scaled real data

| Algorithm | 0.1% scale | | | 1% scale | | |
|---|---|---|---|---|---|---|
| | Revenue | Pickup ETA | Served % | Revenue | Pickup ETA | Served % |
| MRM | 10707 | 22.74 | 20.9 | 117621 | 22.32 | 20.16 |
| MPDM | 11477 | 11.99 | 31.6 | 134454 | 6.1 | 36.79 |
| SD-DQN | 12085 ± 19 | 19.15 ± 0.16 | 24.96 ± 0.11 | 145182 ± 244 | 15.07 ± 0.11 | 27.64 ± 0.09 |
| MD-DQN | 11145 ± 78 | 21.77 ± 0.62 | 21.38 ± 0.32 | 122671 ± 698 | 19.50 ± 0.52 | 22.14 ± 0.76 |

TABLE 7

10% scaled real data

| Algorithm | Revenue | Pickup ETA | Served % |
|---|---|---|---|
| MRM | 1112340 | 22.37 | 20.04 |
| MPDM | 1333180 | 6.2 | 29.4 |
| SD-DQN | 1391141 | 17.28 | 25.3 |
| MD-DQN | 1161780 | 20.05 | 23.17 |

Across all scales, SD-DQN outperforms both myopic baselines (MRM and MPDM), while MD-DQN generally performs above myopic revenue maximization.

Figure 3G:
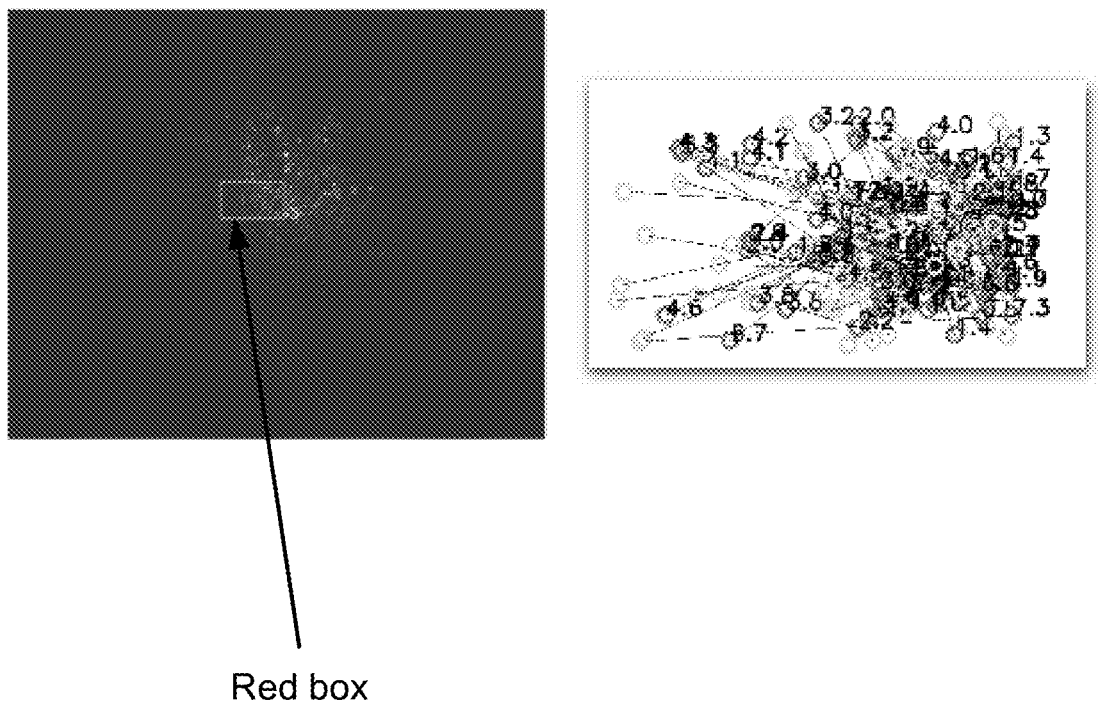
FIG. 3G illustrates historic data order start distribution and corresponding simulator rendering, in accordance with various embodiments of the present disclosure.

In some embodiments, a simulator that uses historical days of orders instead of randomly generated orders is used. The vehicle platform dataset provides 30 days of orders in a certain city. A small spatial region of the city is found to account for 10% of orders both start and end in that region. Then, 30 order generation schemes are created. This region defines the historical data simulator. When the environment is reset, it randomly selects one of the 30 days, and generates orders exactly according to how orders arrived on that day. A fixed number of drivers (e.g., 100), and a fixed speed (e.g., 40 km/h) are used. An illustration of this environment can be found in FIG. 3G. FIG. 3G illustrates historic data order start distribution and corresponding simulator rendering, in accordance with various embodiments of the present disclosure. The red box indicates the small spatial region selected for the simulator. The small spatial region may roughly correspond to an edge of downtown and some outlying areas.

For SD-DQN and MD-DQN, 2 km broadcast radius is imposed. The performance is compared against the standard non-repositioning baselines of myopic revenue maximization (MRM) and myopic pickup distance minimization (MPDM), both of which have no broadcast distance and no repositioning. The performance is also compared against two versions of MPDM with repositioning: MPDM-random and MPDM-demand. When a driver has no orders within 2 km, MPDM-random randomly selects repositioning actions until an order arrives, while MPDM-demand repositions the driver towards the nearest order. The similar relative performance as the historical statistics domain is obtained, with MD-DQN performance above MRM but below MPDM, and SD-DQN outperforming all myopic strategies as shown in Table 8.

TABLE 8

10% region real data

| Algorithm | Revenue | Pickup ETA | Served % |
|---|---|---|---|
| MRM | 414 | 2.60 | 44 |
| MPDM | 511 | 1.1 | 79 |
| MPDM-random | 494 | 0.9 | 73 |
| MPDM-demand | 502 | 0.8 | 76 |
| SD-DQN | 542 | 1.2 | 75 |
| MD-DQN | 474 | 1.8 | 53 |

Figure 3H:
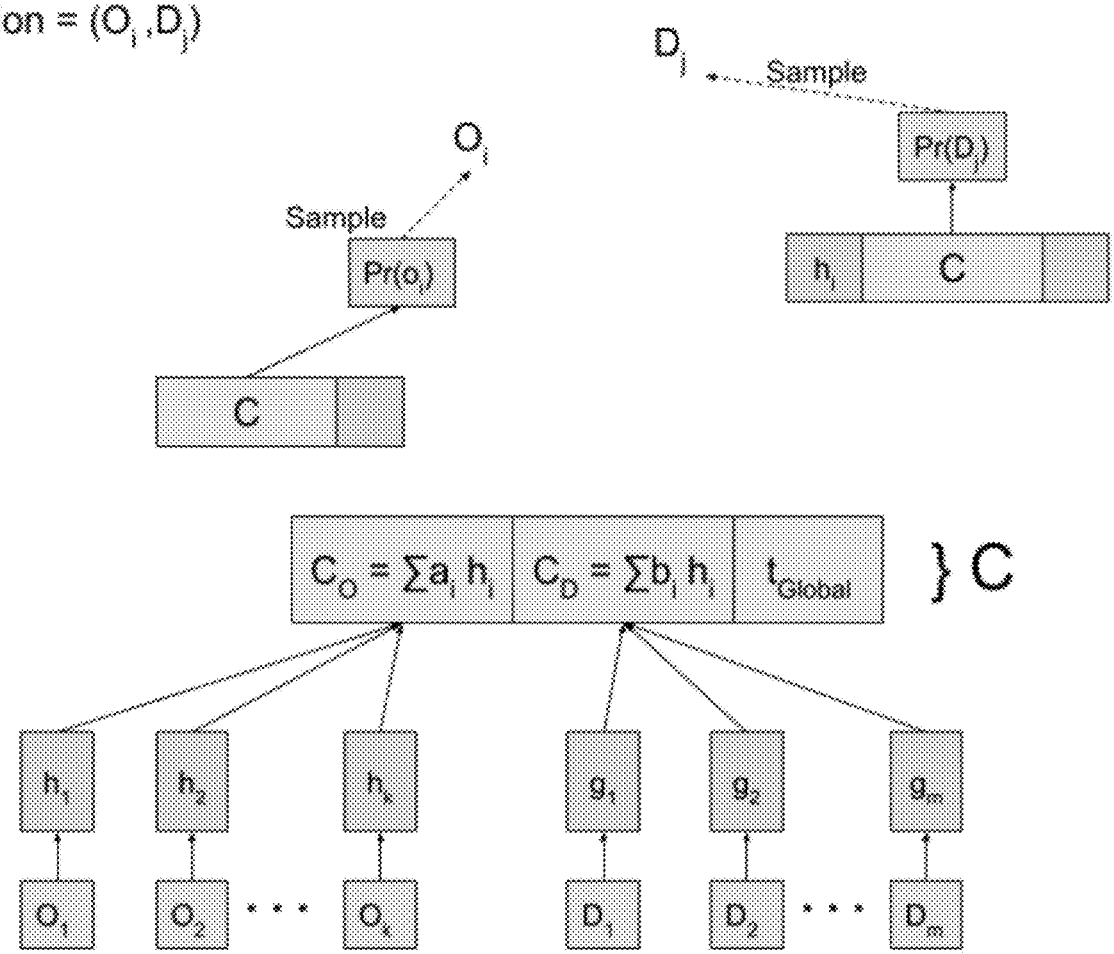
FIG. 3H illustrate an exemplary neural network architecture used in actor critic and policy gradient, in accordance with various embodiments of the present disclosure.

In some embodiments, for actor critic (AC) and policy gradient, an agent can be built around the same network architecture as in Q-learning, simply replacing $Q(s_t, a)$ with $Pr(s_t, a)$ and training with a policy gradient approach (such as A2C or A3C). A branch may be added to the network that computes a critic. Similar to Q-learning, there are single-driver and multi-driver variants. The difference between these two is the learning in the critic. For example, the critic can be trained to estimate returns for single-drivers or for the entire system. The architecture is shown in FIG. 3H.

In some embodiments, global policy improvement uses the same architecture as the above methods but learns a state value function for a fixed dispatching policy (such as pickup distance minimization). The resulting function can be used for control by calculating after-state advantages similarly to the local MDP method. The function can also be used for evaluation metrics. The value function for answers to questions can be queried: what the value is for adding X drivers into a certain region, and what the best direction is to reposition a given driver (according to the gradient of the value function).

FIG. 4 illustrates a flowchart of an exemplary method 400, according to various embodiments of the present disclosure. The method 400 may be implemented in various environments including, for example, the system 100 of FIG. 1. The exemplary method 400 may be implemented by one or more components of the system 102 (e.g., the processor 104, the memory 106) or the computing device 111 (e.g., an in-vehicle computer, a mobile phone associated with a vehicle driver). For example, a non-transitory computer-readable storage medium may store instructions (which may comprise model instructions) that, when executed by a processor, cause the processor to perform the method 400. The exemplary method 400 may be implemented by multiple systems similar to the system 102. The operations of method 400 presented below are intended to be illustrative. Depending on the implementation, the exemplary method 400 may include additional, fewer, or alternative steps performed in various orders or in parallel.

Block 402 comprises obtaining information comprising a location of a vehicle, current orders, and a current time. The obtained information may be included in the data 202 and/or the query 204 described above with reference to FIG. 2.

Block 404 comprises inputting the obtained information to a trained model of a model. In some embodiments, the obtained information may be real-life data to input to a trained model to output real-life information.

Block 406 comprises determining action information for the vehicle based on an output of the trained model, the action information comprising: re-positioning the vehicle or accepting a ride order. The model comprises a multi-driver deep-Q network (MD-DQN) and is configured with model instructions for performing: receiving information of drivers and information of orders as inputs; obtaining a global state based on the information of drivers, the information of orders, and a global time, each state transition of the global state being from a driver of the drivers becomes available to another driver of the drivers becomes available; querying a plurality of driver-order pairs and driver-reposition pairs based at least on the obtained global state to determine a Q-value of the MD-DQN for the driver; and determining the action information as the output based at least on the determined Q-value to optimize a total return (e.g., maximize a total discounted return) for the drivers. Details of the state transition can be referred to FIG. 3A and related descriptions. The model may be configured with the instructions for performing the corresponding steps to train the model. To train the model, the information of drivers, the information of orders, the global time, the driver-order pairs, and the driver-reposition pairs may come from historical data, simulated data, etc.

In some embodiments, alternatively, the model comprises a single-driver deep-Q network (SD-DQN); Q-value determination for the SD-DQN accounts for a discounted return for a single driver; and state transition for the SD-DQN is from the single driver completing a trip to the single driver completing a next trip. Details of the state transition can be referred to FIG. 3A and related descriptions.

In some embodiments, the method further comprises: providing the action information to the vehicle (e.g., in data 207), wherein the action information maximizes a reward for the vehicle's driver (e.g., a total income for the vehicle driver for the day). For example, the action information (e.g., a determined rider order or reposition instruction) may be played via an in-vehicle computer or the driver's mobile phone. For another example, the corresponding vehicle may be controlled to execute the action information. The mechanical parts of the vehicle may be actuated by an in-vehicle computer that receives the action information and determines to carry out the action information.

In some embodiments, for each of the drivers, the information of drivers comprises two-dimensional location coordinates and a step-left scalar value; and the step-left scalar value is based on a time of arrival at a destination of a currently dispatched order. Details can be referred to the three-dimensional vector for drivers described herein.

In some embodiments, for each of the orders, the information of orders comprises two-dimensional start location coordinates, two-dimensional end location coordinates, a price scale value, and a time waiting scalar value; and the time waiting scalar value is a time since the each of the orders started requesting a vehicle dispatch. Details can be referred to the six-dimensional vector for orders described herein.

In some embodiments, obtaining the global state based on the information of drivers (e.g., $D_1, D_2, \ldots$), the information of orders (e.g., $O_1, O_2, \ldots$), and the global time comprises: embedding the information of drivers and the information of orders in memory cells to obtain driver embedding (e.g., $g^1$, $g^2$, ...) and order embedding (e.g., $h^1$, $h^2$, ...); performing a round of attention of an attention mechanism to obtain driver context based on the driver embedding and obtain order context based on the order embedding; and concatenating the driver embedding, the order embedding, and the global time to obtain the global state (e.g., C). Details can be referred to FIG. 3B and related descriptions.

In some embodiments, querying the plurality of driver-order pairs and driver-reposition pairs based at least on the obtained global state to determine the action information as the output comprises: querying all driver-order pairs with respect to the drivers and the orders to obtain first Q-values respectively, and querying all driver-reposition pairs with respect to the drivers and repositioning movements to obtain second Q-values respectively; obtaining a maximum Q-value among the first and second Q-values; determining an optimal driver-order pair or an optimal driver-reposition pair associated with the maximum Q-value; and determining the action information as dispatching a corresponding driver to fulfill a corresponding order according to the optimal driver-order pair or repositioning a corresponding driver according to the optimal driver-reposition pair. Details can be referred to FIG. 3B and related descriptions.

In some embodiments, repositioning the corresponding driver comprises: staying at a current location of the corresponding driver or moving to another location.

In some embodiments, querying all the driver-order pairs with respect to the drivers and the orders to obtain the first Q-values respectively comprises: determining the first Q-values respectively based on a first neural network; and the first neural network takes the driver embedding, the order embedding, and the global states as inputs.

In some embodiments, querying all the driver-reposition pairs with respect to the drivers and the repositioning movements to obtain the second Q-values respectively comprises: determining the second Q-values respectively based on a second neural network; and the second neural network takes the driver embedding, repositioning movement embedding (e.g., ml), and the global states as inputs, wherein the repositioning movement embedding is obtained by embedding the repositioning movements.

As such, the described models can be used to implement optimal order dispatching and repositioning decisions for the vehicle platform. The decisions allow the vehicle drivers to improve their income and service efficiency.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
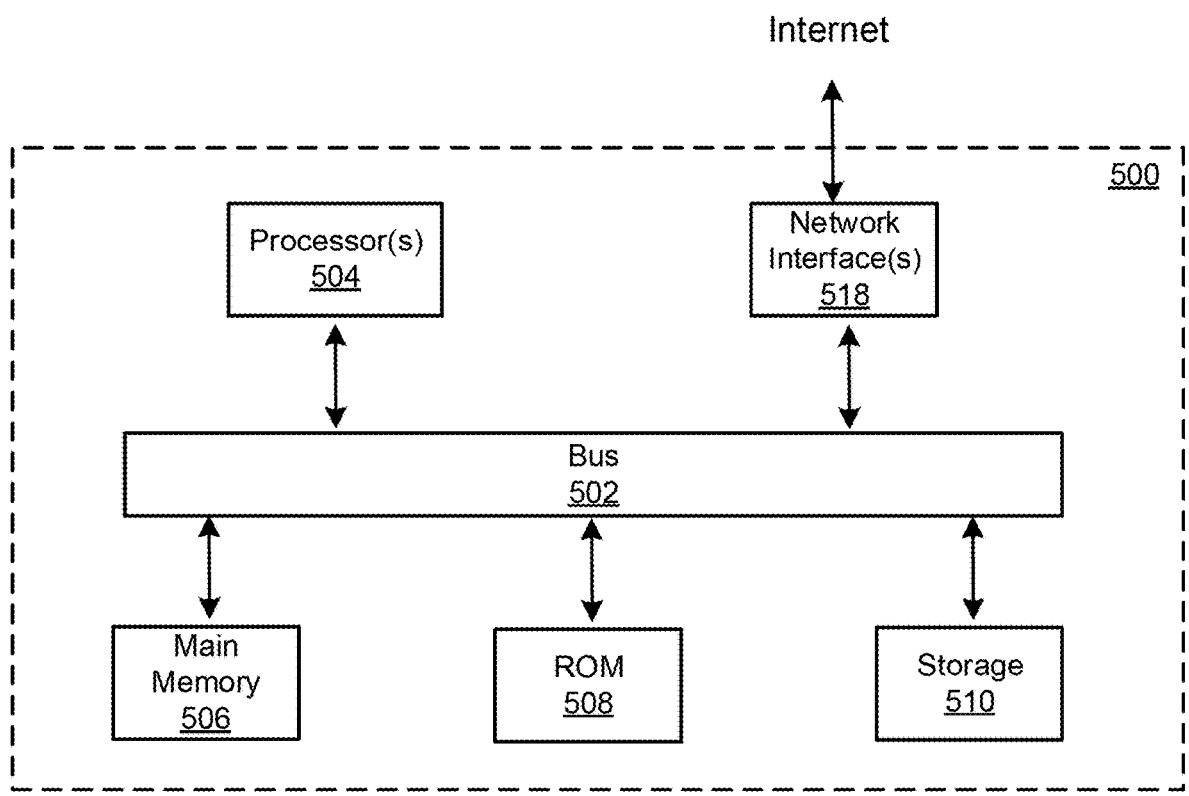
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for ride order dispatching and vehicle repositioning, comprising:
obtaining information comprising a location of a vehicle, current orders, and a current time;
inputting the obtained information to a trained model; and
determining action information for the vehicle based on an output of the trained model, the action information comprising: re-positioning the vehicle or accepting a ride order, wherein:
the model comprises a multi-driver deep-Q network (MD-DQN) and is configured with model instructions for performing:
receiving information of drivers and information of orders as inputs;
obtaining a global state based on the information of drivers, the information of orders, and a global time, each state transition of the global state being from a driver of the drivers becoming available to another driver of the drivers becoming available;
querying a plurality of driver-order pairs and driver-reposition pairs based at least on the obtained global state to determine a Q-value of the MD-DQN for the driver;
determining the action information as the output based at least on the determined Q-value to optimize a total return for the drivers; and
sending the determined action information to the vehicle for execution,
wherein the method further comprises:
training the MD-DQN based on training data comprising historical driver information, historical order information, and expected action values, wherein the training comprises:
predicting a Q-value for each entry in the training data;
determining an error based on the 0-value and an expected action value using a loss function; and
propagating the error back through the MD-DQN and updating weights of a plurality of layers of the MD-DQN according to the propagated error.

2. The method of claim 1, further comprising:
providing the action information to the vehicle, wherein the action information maximizes a reward for the vehicle's driver.

3. The method of claim 1, wherein:
for each of the drivers, the information of drivers comprises two-dimensional location coordinates and a step-left scalar value; and
the step-left scalar value is based on a time of arrival at a destination of a currently dispatched order.

4. The method of claim 1, wherein:
for each of the orders, the information of orders comprises two-dimensional start location coordinates, two-dimensional end location coordinates, a price scale value, and a time waiting scalar value; and
the time waiting scalar value is a time since the each of the orders started requesting a vehicle dispatch.

5. The method of claim 1, wherein obtaining the global state based on the information of drivers, the information of orders, and the global time comprises:
embedding the information of drivers and the information of orders in memory cells to obtain driver embedding and order embedding;
performing a round of attention of an attention mechanism to obtain driver context based on the driver embedding and obtain order context based on the order embedding; and
concatenating the driver embedding, the order embedding, and the global time to obtain the global state.

6. The method of claim 5, wherein querying the plurality of driver-order pairs and driver-reposition pairs based at least on the obtained global state to determine the action information as the output comprises:
querying all driver-order pairs with respect to the drivers and the orders to obtain first Q-values respectively, and querying all driver-reposition pairs with respect to the drivers and repositioning movements to obtain second Q-values respectively;
obtaining a maximum Q-value among the first and second Q-values;
determining an optimal driver-order pair or an optimal driver-reposition pair associated with the maximum Q-value; and
determining the action information as dispatching a corresponding driver to fulfill a corresponding order according to the optimal driver-order pair or repositioning a corresponding driver according to the optimal driver-reposition pair.

7. The method of claim 6, wherein repositioning the corresponding driver comprises:
staying at a current location of the corresponding driver.

8. The method of claim 6, wherein querying all the driver-order pairs with respect to the drivers and the orders to obtain the first Q-values respectively comprises:
 determining the first Q-values respectively based on a first neural network; and
 the first neural network takes the driver embedding, the order embedding, and the global states as inputs.

9. The method of claim 6, wherein querying all the driver-reposition pairs with respect to the drivers and the repositioning movements to obtain the second Q-values respectively comprises:
 determining the second Q-values respectively based on a second neural network; and
 the second neural network takes the driver embedding, repositioning movement embedding, and the global states as inputs, wherein the repositioning movement embedding is obtained by embedding the repositioning movements.

10. A system for ride order dispatching and vehicle repositioning, comprising a processor and a non-transitory computer-readable storage medium storing instructions that, when executed by the processor, cause the system to perform operations comprising:
 obtaining information comprising a location of a vehicle, current orders, and a current time;
 inputting the obtained information to a trained model; and
 determining action information for the vehicle based on an output of the trained model, the action information comprising:
 re-positioning the vehicle or accepting a ride order,
 wherein:
 the model comprises a multi-driver deep-Q network (MD-DQN) and is configured with model instructions for performing: receiving information of drivers and information of orders as inputs;
 obtaining a global state based on the information of drivers, the information of orders, and a global time, each state transition of the global state being from a driver of the drivers becoming available to another driver of the drivers becoming available;
 querying a plurality of driver-order pairs and driver-reposition pairs based at least on the obtained global state to determine a Q-value of the MD-DQN for the driver;
 determining the action information as the output based at least on the determined Q-value to optimize a total return for the drivers; and
 sending the determined action information to the vehicle for execution,
 wherein the operations further comprise:
 training the MD-DON based on training data comprising historical driver information, historical order information, and expected action values, wherein the training comprises:
 predicting a Q-value for each entry in the training data;
 determining an error based on the 0-value and an expected action value using a loss function; and propagating the error back through the MD-DON and updating weights of a plurality of layers of the MD-DON according to the propagated error.

11. The system of claim 10, wherein the operations further comprise:
 providing the action information to the vehicle, wherein the action information maximizes a reward for the vehicle's driver.

12. The system of claim 10, wherein:
 for each of the drivers, the information of drivers comprises two-dimensional location coordinates and a step-left scalar value; and
 the step-left scalar value is based on a time of arrival at a destination of a currently dispatched order.

13. The system of claim 10, wherein:
 for each of the orders, the information of orders comprises two-dimensional start location coordinates, two-dimensional end location coordinates, a price scale value, and a time waiting scalar value; and
 the time waiting scalar value is a time since the each of the orders started requesting a vehicle dispatch.

14. The system of claim 10, wherein obtaining the global state based on the information of drivers, the information of orders, and the global time comprises:
 embedding the information of drivers and the information of orders in memory cells to obtain driver embedding and order embedding;
 performing a round of attention of an attention mechanism to obtain driver context based on the driver embedding and obtain order context based on the order embedding; and
 concatenating the driver embedding, the order embedding, and the global time to obtain the global state.

15. The system of claim 14, wherein querying the plurality of driver-order pairs and driver-reposition pairs based at least on the obtained global state to determine the action information as the output comprises:
 querying all driver-order pairs with respect to the drivers and the orders to obtain first Q-values respectively, and querying all driver-reposition pairs with respect to the drivers and repositioning movements to obtain second Q-values respectively;
 obtaining a maximum Q-value among the first and second Q-values;
 determining an optimal driver-order pair or an optimal driver-reposition pair associated with the maximum Q-value; and
 determining the action information as dispatching a corresponding driver to fulfill a corresponding order according to the optimal driver-order pair or repositioning a corresponding driver according to the optimal driver-reposition pair.

16. The system of claim 15, wherein repositioning the corresponding driver comprises:
 staying at a current location of the corresponding driver.

17. The system of claim 15, wherein querying all the driver-order pairs with respect to the drivers and the orders to obtain the first Q-values respectively comprises:
 determining the first Q-values respectively based on a first neural network; and
 the first neural network takes the driver embedding, the order embedding, and the global states as inputs.

18. The system of claim 15, wherein querying all the driver-reposition pairs with respect to the drivers and the repositioning movements to obtain the second Q-values respectively comprises:
 determining the second Q-values respectively based on a second neural network; and
 the second neural network takes the driver embedding, repositioning movement embedding, and the global states as inputs, wherein the repositioning movement embedding is obtained by embedding the repositioning movements.

19. A non-transitory computer-readable storage medium storing instructions that, when executed by a processor, cause the processor to perform operations comprising:
 obtaining information comprising a location of a vehicle, current orders, and a current time;
 inputting the obtained information to a trained model; and
 determining action information for the vehicle based on an output of the trained model, the action information comprising: re-positioning the vehicle or accepting a ride order, wherein:
 the model comprises a multi-driver deep-Q network (MD-DQN) and is configured with model instructions for performing:
 receiving information of drivers and information of orders as inputs;
 obtaining a global state based on the information of drivers, the information of orders, and a global time, each state transition of the global state being from a driver of the drivers becoming available to another driver of the drivers becoming available;
 querying a plurality of driver-order pairs and driver-reposition pairs based at least on the obtained global state to determine a Q-value of the MD-DQN for the driver;
 determining the action information as the output based at least on the determined Q-value to optimize a total return for the drivers; and
 sending the determined action information to the vehicle for execution, wherein the operations further comprise:
 training the MD-DQN based on training data comprising historical driver information, historical order information, and expected action values, wherein the training comprises:
 predicting a Q-value for each entry in the training data;
 determining an error based on the Q-value and an expected action value using a loss function; and propagating the error back through the MD-DQN and updating weights of a plurality of layers of the MD-DQN according to the propagated error.

20. The storage medium of claim 19, wherein obtaining the global state based on the information of drivers, the information of orders, and the global time comprises:
 embedding the information of drivers and the information of orders in memory cells to obtain driver embedding and order embedding;
 performing a round of attention of an attention mechanism to obtain driver context based on the driver embedding and obtain order context based on the order embedding; and
 concatenating the driver embedding, the order embedding, and the global time to obtain the global state.

* * * * *

UNITED STATES PATENT AND TRADEMARK OFFICE
CERTIFICATE OF CORRECTION

| | |
|---|---|
| PATENT NO. | : 11,455,578 B2 |
| APPLICATION NO. | : 16/237175 |
| DATED | : September 27, 2022 |
| INVENTOR(S) | : Zhiwei Qin et al. |

Page 1 of 2

It is certified that error appears in the above-identified patent and that said Letters Patent is hereby corrected as shown below:

On the Title Page

In the Related U.S. Application Data:
"(60) Provisional application No. 62/726,898, filed on Sep. 7, 2018, provisional application No. 62/774,322, filed on Dec. 2, 2018." should read -- (60) Provisional application No. 62/726,898, filed on Sep. 4, 2018, provisional application No. 62/774,322, filed on Dec. 2, 2018. --

In the Claims

In Claim 1, Column 30, Line 4, "training the MD-DON based on training data comprising" should read -- training the MD-DQN based on training data comprising --

In Claim 1, Column 30, Line 9, "determining an error based on the 0-value and an expected" should read -- determining an error based on the Q-value and an expected --

In Claim 1, Column 30, Lines 11-13, "propagating the error back through the MD-DON and updating weights of a plurality of layers of the MD-DON according to the propagated error." should read -- propagating the error back through the MD-DQN and updating weights of a plurality of layers of the MD-DQN according to the propagated error. --

In Claim 10, Column 31, Line 58, "determining an error based on the 0-value and an expected" should read -- determining an error based on the Q-value and an expected --

In Claim 10, Column 31, Lines 60-61, "error back through the MD-DON and updating weights of a plurality of layers of the MD-DON according to the" should read -- error back through the MD-DQN and updating weights of a plurality of layers of the MD-DQN according to the --

In Claim 19, Column 34, Line 3, "training the MD-DON based on training data comprising" should read -- training the MD-DQN based on training data comprising --

Signed and Sealed this
Twentieth Day of December, 2022

*Katherine Kelly Vidal*

Katherine Kelly Vidal
*Director of the United States Patent and Trademark Office*

CERTIFICATE OF CORRECTION (continued)
U.S. Pat. No. 11,455,578 B2

In Claim 19, Column 34, Line 8, "determining an error based on the 0-value and an expected" should read -- determining an error based on the Q-value and an expected --

In Claim 19, Column 34, Lines 10-11, "error back through the MD-DON and updating weights of a plurality of layers of the MD-DON according to the" should read -- error back through the MD-DQN and updating weights of a plurality of layers of the MD-DQN according to the --